(12) United States Patent
Fu et al.

(10) Patent No.: US 11,431,624 B2
(45) Date of Patent: Aug. 30, 2022

(54) COMMUNICATION METHOD AND NETWORK INTERFACE CARD

(71) Applicant: Huawei Technologies Co., Ltd., Shenzhen (CN)

(72) Inventors: Binzhang Fu, Beijing (CN); Kun Tan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/201,833

(22) Filed: Mar. 15, 2021

(65) Prior Publication Data

US 2021/0226892 A1 Jul. 22, 2021

Related U.S. Application Data

(63) Continuation of application No. PCT/CN2020/102466, filed on Jul. 16, 2020.

(30) Foreign Application Priority Data

Jul. 19, 2019 (CN) .......................... 201910655048.9

(51) Int. Cl.
*H04L 45/586* (2022.01)
*H04L 12/46* (2006.01)
(Continued)

(52) U.S. Cl.
CPC ........ *H04L 45/586* (2013.01); *H04L 12/4633* (2013.01); *H04L 12/4641* (2013.01);
(Continued)

(58) Field of Classification Search
CPC ............... H04L 45/66; H04L 45/74586; H04L 12/4641; H04L 12/4633
See application file for complete search history.

(56) References Cited

U.S. PATENT DOCUMENTS 9,331,963 B2 5/2016 Krishnamurthi et al.
2006/0126619 A1 6/2006 Teisberg et al.
(Continued)

FOREIGN PATENT DOCUMENTS

CN 103763173 A 4/2014
CN 104054067 A 9/2014
(Continued)

OTHER PUBLICATIONS

Tripathi, Sunay et al. "Crossbow: from hardware virtualized NICs to virtualized networks." VISA '09 (Year: 2009).*
(Continued)

*Primary Examiner* — John M MacIlwinen
(74) *Attorney, Agent, or Firm* — Conley Rose, P.C.

(57) ABSTRACT

A communication method includes obtaining, by a source remote direct memory access (RDMA) network interface card (RNIC), to-be-transmitted data sent by a source virtual RNIC (vRNIC), obtaining, by the source RNIC, identity indication information of a destination vRNIC and packet forwarding information, and encapsulating, by the source RNIC, the to-be-transmitted data to obtain a target packet, and sending the target packet to a destination RNIC, where the destination vRNIC is a vRNIC running on the destination RNIC.

20 Claims, 6 Drawing Sheets

(51) Int. Cl.
*H04L 45/00* (2022.01)
*H04L 45/74* (2022.01)
*H04L 101/622* (2022.01)

(52) U.S. Cl.
CPC .............. *H04L 45/66* (2013.01); *H04L 45/74* (2013.01); *H04L 2101/622* (2022.05)

(56) References Cited

U.S. PATENT DOCUMENTS

| | | |
|---|---|---|
| 2013/0107881 A1 | 5/2013 | Barabash et al. |
| 2015/0012606 A1 | 1/2015 | Gadipudi |
| 2015/0026287 A1 | 1/2015 | Stevens et al. |
| 2015/0178242 A1 | 6/2015 | Snyder, III |
| 2016/0026605 A1 | 1/2016 | Pandit et al. |
| 2016/0188527 A1* | 6/2016 | Cherian ............... H04L 45/64 709/212 |
| 2017/0054593 A1 | 2/2017 | Borikar et al. |
| 2017/0177222 A1 | 6/2017 | Singh et al. |
| 2018/0287938 A1* | 10/2018 | Han .................. H04L 61/103 |
| 2018/0307972 A1 | 10/2018 | Feng et al. |
| 2019/0004847 A1 | 1/2019 | Yang et al. |
| 2019/0312820 A1* | 10/2019 | Yu ...................... H04L 47/36 |
| 2020/0213246 A1* | 7/2020 | Pan ................ G06F 15/17331 |
| 2020/0218688 A1 | 7/2020 | Qu et al. |
| 2020/0326971 A1 | 10/2020 | Yang |

FOREIGN PATENT DOCUMENTS

| | | |
|---|---|---|
| CN | 104636185 A | 5/2015 |
| CN | 105404542 A | 3/2016 |
| CN | 106953797 A | 7/2017 |
| CN | 107113298 A | 8/2017 |
| CN | 107357660 A | 11/2017 |
| CN | 107508828 A | 12/2017 |
| CN | 107766261 A | 3/2018 |
| CN | 105472023 B | 11/2018 |
| CN | 105227464 B | 1/2019 |
| CN | 109491809 A | 3/2019 |
| CN | 109983439 A | 7/2019 |
| WO | 2012135442 A1 | 10/2012 |
| WO | 2018119774 A1 | 7/2018 |

OTHER PUBLICATIONS

Mahalingam, Mallik et al. "Virtual extensible Local Area Network (VXLAN): A Framework for Overlaying Virtualized Layer 2 Networks over Layer 3 Networks." RFC 7348: 1-22. (Year: 2014).*
Dunning, Dave et al. "The Virtual Interface Architecture." IEEE Micro 18: 66-76. (Year: 1998).*
Fox, M., et al., "IBM's Shared Memory Communications over RDMA (SMC-R) Protocol," RFC 7609, Aug. 2015, 143 pages.
Firestone, D., et al., "Azure Accelerated Networking: SmartNICs in the Public Cloud," The Proceedings of the 15th USENIX Symposium on Networked Systems Design and Implementation (NSDI 18), Apr. 9-11, 2018, Renton, WA, USA, 15 pages.

* cited by examiner

COMMUNICATION METHOD AND NETWORK INTERFACE CARD

CROSS-REFERENCE TO RELATED APPLICATIONS

This application is a continuation of International Patent Application No. PCT/CN2020/102466 filed on Jul. 16, 2020, which claims priority to Chinese Patent Application No. 201910655048.9 filed on Jul. 19, 2019. The disclosures of the aforementioned applications are hereby incorporated by reference in their entireties.

TECHNICAL FIELD

This application relates to the field of communications technologies, and in particular, to a communication method and a network interface card.

BACKGROUND

Remote direct memory access (RDMA) is a technology that is generated to resolve a delay of data processing of a compute node in network transmission. The RDMA technology can be used to directly transmit data from a memory of one compute node to another compute node without access of a peer operating system. In this way, network communication with a high throughput and a low latency is allowed.

To be compatible with Ethernet, an RDMA over converged Ethernet (RoCE) technology is proposed in the industry. In this way, the RDMA technology may be applied to a cloud computing scenario or a similar scenario.

In the cloud computing scenario or the similar scenario, most tenants run in a virtual machine (VM) or a container. In this case, an RDMA capability needs to be provided for the VM or the container. To achieve this objective, input/output (IO) virtualization may be implemented by using a hardware virtualization technology. Specifically, one physical network interface card may be abstracted as a plurality of virtual network interface cards supporting the RDMA technology by using the hardware virtualization technology. After a driver of a dedicated virtual network interface card is deployed on the VM, a tenant can use the virtual network interface card like using the physical network interface card.

When the tenant needs to send data, the virtual network interface card can directly read the data from a memory of the VM. It should be noted that, because the data is directly read from the memory of the VM, and packet encapsulation is completed by the virtual network interface card, a packet sent from the virtual network interface card is encapsulated by using a virtual network address. Source and destination media access control (MAC) addresses in an Ethernet layer 2 protocol header in a packet header and source and destination Internet protocol (IP) addresses in an IP header are all addresses of the virtual network interface card. Network devices (such as a router and a switch) cannot identify the addresses of the virtual network interface card. Therefore, the packet cannot be correctly routed to a target node.

Therefore, how to use the RoCE technology to perform data transmission in a virtualization scenario is an urgent problem to be resolved.

SUMMARY

This application provides a communication method and a network interface card, to improve an effective throughput in a network.

According to a first aspect, an embodiment of this application provides a communication method. The method includes a source RDMA network interface card (RNIC) obtains to-be-transmitted data sent by a source virtual RNIC (vRNIC), where the source vRNIC is a vRNIC running on the source RNIC, the source RNIC obtains identity indication information of a destination vRNIC and packet forwarding information, where the packet forwarding information includes an IP address of the source RNIC, a MAC address of the source RNIC, an IP address of a destination RNIC, a MAC address of the destination RNIC, and layer 4 port numbers, the source RNIC encapsulates the to-be-transmitted data to obtain a target packet, where the target packet includes the packet forwarding information, the identity indication information of the destination vRNIC, and the to-be-transmitted data, and the target packet does not include at least one piece of the following information an IP address of the source vRNIC, an IP address of the destination vRNIC, a MAC address of the source vRNIC, a port number of the source vRNIC, and a port number of the destination vRNIC, and the source RNIC sends the target packet to the destination RNIC, where the destination vRNIC is a vRNIC running on the destination RNIC.

Optionally, the source RNIC may be a physical network interface card that supports an RDMA technology, or a virtual network interface card that supports the RDMA technology.

Optionally, the destination RNIC may be a physical network interface card that supports the RDMA technology, or a virtual network interface card that supports the RDMA technology.

In the foregoing technical solution, data transmission may be performed in a virtualization scenario through an RoCE technology. In addition, packet encapsulation may be performed only once on the to-be-transmitted data. Specifically, there is no need performing encapsulation once on the source RNIC first. The IP address, the MAC address, and port number information that are of the source vRNIC, and the IP address and port number information that are of the destination vRNIC are encapsulated into a packet. Then the encapsulation is performed for a second time. The IP address of the source RNIC, the MAC address of the source RNIC, the IP address of the destination RNIC, the MAC address of the destination RNIC, and the layer 4 port numbers are encapsulated into the packet. The encapsulation may be performed on the source RNIC only once. The IP address of the source RNIC, the MAC address of the source RNIC, the IP address of the destination RNIC, the MAC address of the destination RNIC, and the layer 4 port numbers are encapsulated into the packet. Because an encapsulated packet no longer includes the IP address, the MAC address, and port number information that are of the source vRNIC, and the IP address and the port number information that are of the destination vRNIC, more space in a payload of the target packet may be spared for transmitting the to-be-transmitted data, so that an effective throughput in a network can be improved. In addition, in the foregoing solution, an encapsulation process of the to-be-transmitted data may be completed by an RNIC. Therefore, additional hardware for encapsulating the to-be-transmitted data does not need to be configured. In this way, costs of applying the RDMA technology in the Ethernet can be reduced. The target packet may be a packet based on an RoCE standard format.

With reference to the first aspect, in a possible implementation of the first aspect, that the source RNIC obtains identity indication information of a destination vRNIC and packet forwarding information includes the source RNIC obtains the identity indication information of the destination vRNIC and the packet forwarding information based on an identifier of the source vRNIC and a transmission mode used to transmit the to-be-transmitted data. Based on the foregoing technical solution, the source RNIC may select, based on different transmission modes, different manners to obtain the packet forwarding information.

With reference to the first aspect, in a possible implementation of the first aspect, that the source RNIC obtains the identity indication information of the destination vRNIC and the packet forwarding information based on an identifier of the source vRNIC and a transmission mode includes, when the transmission mode is a reliable connection (RC) or an unreliable connection (UC), the source RNIC determines the identity indication information of the destination vRNIC and the packet forwarding information based on a target queue pair context (QPC), where the target QPC is corresponding to connection information and the identifier of the source vRNIC. Based on the foregoing technical solution, when the transmission mode is the RC or the UC, the source RNIC may directly obtain, from the QPC, the identity indication information of the destination vRNIC and the packet forwarding information.

With reference to the first aspect, in a possible implementation of the first aspect, that the source RNIC obtains the identity indication information of the destination vRNIC and the packet forwarding information based on an identifier of the source vRNIC and a transmission mode includes, when the transmission mode is a RC or an UC, the source RNIC determines a target virtual network address from a reference QPC or a reference work queue element (WQE), where the target virtual network address includes at least one of the IP address of the source vRNIC and the IP address of the destination vRNIC, the reference QPC is corresponding to connection information and the identifier of the source vRNIC, and the reference WQE is corresponding to the connection information and the identifier of the source vRNIC, and the source RNIC determines, from a tunnel table, the identity indication information of the destination vRNIC and the packet forwarding information, where the tunnel table includes at least one tunnel entry, and each tunnel entry in the at least one tunnel entry is used to indicate an identifier of a first vRNIC, a virtual extensible local area network (VXLAN) network identifier (VNI) to which a second vRNIC belongs, a virtual network address, address information of a first RNIC, and address information of a second RNIC. The first vRNIC runs in the first RNIC, and the second vRNIC runs in the second RNIC. The virtual network address includes at least one of an IP address of the first vRNIC and an IP address of the second vRNIC, and a tunnel entry that is in the at least one tunnel entry and that matches the identifier of the source vRNIC and the target virtual network address includes the packet forwarding information. Based on the foregoing technical solution, when the transmission mode is the RC or the UC, the source RNIC may obtain, from the pre-stored tunnel table, the identity indication information of the destination vRNIC and the packet forwarding information.

With reference to the first aspect, in a possible implementation of the first aspect, that the source RNIC obtains the identity indication information of the destination vRNIC and the packet forwarding information based on an identifier of the source vRNIC and a transmission mode includes, when the transmission mode is an unreliable data packet (UD) or a reliable data packet (RD), the source RNIC determines a target virtual network address based on a target WQE corresponding to the to-be-transmitted data and the identifier corresponding to the source vRNIC, or determines, based on the target WQE, the target virtual network address, where the target virtual network address includes at least one of the IP address of the source vRNIC and the IP address of the destination vRNIC, and the source RNIC determines, from a tunnel table, the identity indication information of the destination vRNIC and the packet forwarding information, where the tunnel table includes at least one tunnel entry, and each tunnel entry in the at least one tunnel entry is used to indicate an identifier of a first vRNIC, a VNI to which a second vRNIC belongs, a virtual network address, address information of a first RNIC, and address information of a second RNIC. The first vRNIC runs in the first RNIC, and the second vRNIC runs in the second RNIC. The virtual network address includes at least one of an IP address of the first vRNIC and an IP address of the second vRNIC, and a tunnel entry that is in the at least one tunnel entry and that matches the identifier of the source vRNIC and the target virtual network address includes the packet forwarding information. Based on the foregoing technical solution, when the transmission mode is the RD or the UD, the source RNIC may directly obtain, from a QPC, the identity indication information of the destination vRNIC and the packet forwarding information.

With reference to the first aspect, in a possible implementation of the first aspect, that the source RNIC obtains identity indication information of a destination vRNIC and packet forwarding information includes the source RNIC sends a request message to at least one target network interface card, where each target network interface card in the at least one target network interface card runs at least one vRNIC, the at least one vRNIC and the source vRNIC belong to a same VNI, the request message includes an identifier of the source vRNIC and a target virtual network address, and the target virtual network address includes at least one of the IP address of the source vRNIC and the IP address of the destination vRNIC, the source RNIC receives feedback information sent by the destination RNIC, where the feedback information includes the IP address of the destination RNIC and the MAC address of the destination RNIC, and the source RNIC determines the identity indication information of the destination vRNIC and the packet forwarding information based on the feedback information. Based on the foregoing technical solution, when the source RNIC does not store the IP address and the MAC address that are of the destination RNIC, the source RNIC may actively obtain the IP address and the MAC address that are of the destination RNIC.

With reference to the first aspect, in a possible implementation of the first aspect, the target packet includes a MAC header, an IP header, a layer 4 port number header, a network virtualization protocol header, and a payload field. The MAC header includes the MAC address of the source RNIC and the MAC address of the destination RNIC. The IP header includes the IP address of the source RNIC and the IP address of the destination RNIC. The layer 4 port number header includes the layer 4 port numbers. The network virtualization header includes the identity indication information of the destination vRNIC. The payload field includes the to-be-transmitted data. In the foregoing technical solution, a packet format of the target packet is similar to an existing packet format. Therefore, the existing packet format is slightly changed, to facilitate implementation of the technical solution of this application.

With reference to the first aspect, in a possible implementation of the first aspect, the identity indication information of the destination vRNIC includes a VNI to which the destination vRNIC belongs and a virtual MAC address of the destination vRNIC. That the VNI to which the destination vRNIC belongs and the virtual MAC address of the destination vRNIC are used as the identity indication information of the destination vRNIC can avoid a case in which the destination vRNIC cannot be accurately found because the identifier of the destination vRNIC changes due to migration of the destination vRNIC.

With reference to the first aspect, in a possible implementation of the first aspect, the identity indication information of the destination vRNIC includes a number of the destination vRNIC.

With reference to the first aspect, in a possible implementation of the first aspect, the target packet further includes identity indication information of the source vRNIC.

With reference to the first aspect, in a possible implementation of the first aspect, the network virtualization protocol header of the target packet includes the identity indication information of the source vRNIC.

According to a second aspect, an embodiment of this application provides a communication method. The method includes a destination RNIC receives a packet sent by a source RNIC, where the packet includes packet forwarding information, identity indication information of a destination vRNIC, and data, the packet forwarding information includes an IP address of the source RNIC, a MAC address of the source RNIC, an IP address of the destination RNIC, a MAC address of the destination RNIC, and layer 4 port numbers, and the target packet does not include at least one of an IP address of a source vRNIC, an IP address of the destination vRNIC, a MAC address of the source vRNIC, a port number of the source vRNIC, and a port number of the destination vRNIC, the source vRNIC is a vRNIC running in the source RNIC, and the destination vRNIC is a vRNIC running in the destination RNIC, the destination RNIC determines the destination vRNIC based on the identity indication information of the destination vRNIC, and the destination RNIC sends the packet to the destination vRNIC. In the foregoing technical solution, the packet received by the destination RNIC no longer includes the IP address, the MAC address, and port number information that are of the source vRNIC, and the IP address and port number information that are of the destination vRNIC. Therefore, more space in a payload of the packet may be spared for transmitting the data, so that an effective throughput in a network can be improved.

With reference to the second aspect, in a possible implementation of the second aspect, the packet includes a MAC header, an IP header, a layer 4 port number header, a network virtualization protocol header, and a payload field. The MAC header includes the MAC address of the source RNIC and the MAC address of the destination RNIC. The IP header includes the IP address of the source RNIC and the IP address of the destination RNIC. The layer 4 port number header includes the layer 4 port numbers. The network virtualization header includes the identity indication information of the destination vRNIC. The payload field includes the data. In the foregoing technical solution, a packet format of the target packet is similar to an existing packet format. Therefore, the existing packet format is slightly changed, to facilitate implementation of the technical solution of this application.

With reference to the second aspect, in a possible implementation of the second aspect, the identity indication information of the destination vRNIC includes a VNI to which the destination vRNIC belongs and a virtual MAC address of the destination vRNIC. That the destination RNIC determines the destination vRNIC based on the identity indication information of the destination vRNIC includes the destination RNIC determines the destination vRNIC from a virtual device mapping table. The virtual device mapping table includes at least one virtual device entry. Each entry of the at least one virtual device entry includes a VNI, a MAC address, and an identifier. An identifier in a virtual device entry that is in the at least one virtual device entry and that is matched with the VNI to which the destination vRNIC belongs and the virtual MAC address of the destination vRNIC is an identifier of the destination vRNIC. That the VNI to which the destination vRNIC belongs and the MAC address of the destination vRNIC are used as the identity indication information of the destination vRNIC can avoid a case in which the destination vRNIC cannot be accurately found because the identifier of the destination vRNIC changes due to migration of the destination vRNIC.

With reference to the second aspect, in a possible implementation of the second aspect, the identity indication information of the destination vRNIC includes a number of the destination vRNIC.

With reference to the second aspect, in a possible implementation of the second aspect, the target packet further includes identity indication information of the source vRNIC.

With reference to the second aspect, in a possible implementation of the second aspect, the network virtualization protocol header of the target packet includes the identity indication information of the source vRNIC.

According to a third aspect, an embodiment of this application provides a network interface card. The network interface card includes units configured to implement any one of the first aspect or the possible implementations of the first aspect. The network interface card supports an RDMA technology.

According to a fourth aspect, an embodiment of this application provides a network interface card. The network interface card includes units configured to implement any one of the second aspect or the possible implementations of the second aspect. The network interface card supports an RDMA technology.

According to a fifth aspect, an embodiment of this application provides a computer-readable storage medium. The computer-readable storage medium stores an instruction used to implement the method in any one of the first aspect or the possible implementations of the first aspect.

According to a sixth aspect, an embodiment of this application provides a computer-readable storage medium. The computer-readable storage medium stores an instruction used to implement the method in any one of the second aspect or the possible implementations of the second aspect.

According to a seventh aspect, this application provides a computer program product including an instruction. When the computer program product is run on a computer, the computer is enabled to perform the method according to any one of the first aspect or the possible implementations of the first aspect.

According to an eighth aspect, this application provides a computer program product including an instruction. When the computer program product is run on a computer, the computer is enabled to perform the method according to any one of the second aspect or the possible implementations of the second aspect.

According to a ninth aspect, this application provides a communications apparatus. The communications apparatus includes a processing circuit and a storage medium, the storage medium stores program code, and the processing circuit is configured to invoke the program code in the storage medium to perform the method according to any one of the first aspect or the possible implementations of the first aspect. The communications apparatus supports an RDMA technology.

According to a tenth aspect, this application provides a communications apparatus. The communications apparatus includes a processing circuit and a storage medium, the storage medium stores program code, and the processing circuit is configured to invoke the program code in the storage medium to perform the method according to any one of the second aspect or the possible implementations of the second aspect. The communications apparatus supports an RDMA technology.

DESCRIPTION OF EMBODIMENTS

Figure 1:
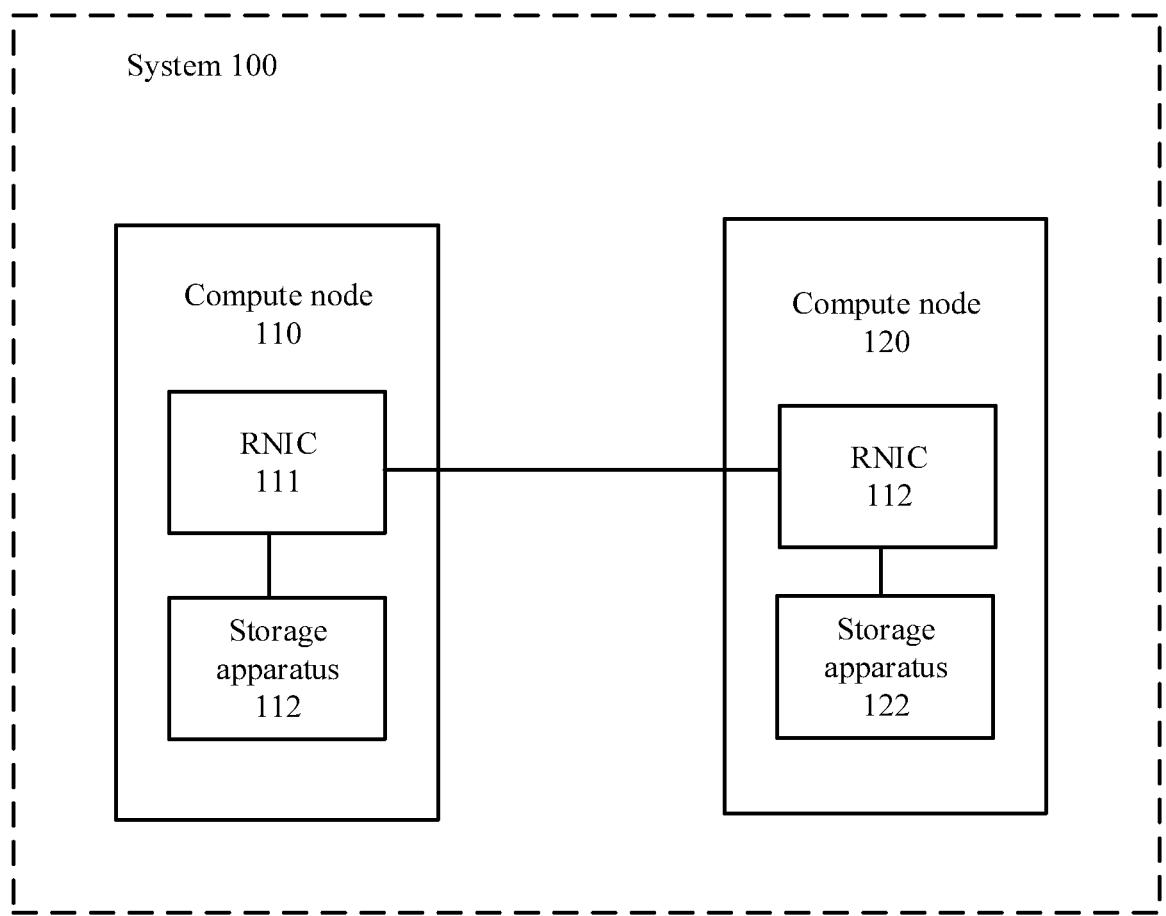
FIG. 1 is a schematic diagram of a system architecture according to an embodiment of this application.

The following describes technical solutions of this application with reference to accompanying drawings.

The technical solutions in the embodiments of this application may be applied to a network interface card and a compute node that support a RDMA technology, for example, a network interface card and a compute node that are of a data center and that support the RDMA technology, or another network interface card and another compute node that support the RDMA technology. A compute node may be connected to a network interface card, and the compute node is an electronic device, for example, a server, a personal computer (for example, a desktop computer device or a notebook computer), and the like, that has a computing capability. The network interface card may be referred to as a network interface card of the compute node. The network interface card may also be referred to as a network interface card, a network adapter, a physical network interface, and the like. The network interface card in the embodiments of this application may be a network interface card that supports the RDMA technology. Therefore, the network interface card may also be referred to as a RNIC.

Optionally, in some embodiments, an RNIC of a compute node may be built in the compute node. For example, the RNIC of the compute node may be connected to a mainboard of the compute node through an interface such as a peripheral component interconnect express (PCIe) interface or a cache coherent interconnect for accelerators (CCIX) interface. The compute node may be referred to as a host of the RNIC.

Optionally, in some other embodiments, an RNIC of a compute node may be an external device of the compute node. For example, the RNIC may be connected to the compute node through a PCIe interface, a quick path interconnect (QPI) interface, a Universal Serial Bus (USB) interface, or the like.

Optionally, a network interface card and a central processing unit (CPU) may be integrated in a system-on-chip (SOC) system.

In the embodiments of this application, a compute node includes a hardware layer, an operating system layer running on the hardware layer, and an application layer running on the operating system layer. The hardware layer includes hardware such as a CPU, a memory management unit (MMU), or a memory (also referred to as a main memory). The operating system may be any one or more computer operating systems that implement service processing by using a process, for example, a LINUX operating system, a UNIX operating system, an ANDROID operating system, an IOS operating system, a WINDOWS operating system, or the like. The application layer includes applications such as a distributed database, distributed storage system, and a distributed artificial intelligence (AI) system. In addition, a specific structure of an execution body of a method provided in the embodiments of this application is not specially limited in the embodiments of this application, provided that a program that records code of the method provided in the embodiments of this application can be run to perform communication according to the method provided in the embodiments of this application. For example, the method provided in the embodiments of this application may be performed by the compute node, or a function module that can invoke and execute the program in the compute node or the station.

FIG. 1 is a schematic diagram of a system architecture according to an embodiment of this application. A system 100 shown in FIG. 1 includes a compute node 110, an RNIC 111, a compute node 120, and an RNIC 121.

An RNIC of the compute node 110 may be the RNIC 111, and an RNIC of the compute node 120 may be the RNIC 121.

The RNIC 111 and the RNIC 121 may be connected through a communications link, and a medium of the communications link may be an optical fiber or the like. A specific medium of the communications link between the network devices is not limited in this embodiment of this application. One or more switching nodes may be included between the RNIC 111 and the RNIC 121, or the RNIC 111 and the RNIC 121 may directly communicate with each other. As shown in FIG. 1, the compute node 110 includes a storage apparatus 112. The storage apparatus 112 may be configured to store queue information and application data of the compute node 110. The compute node 120 includes a storage apparatus 122. The storage apparatus 122 may be configured to store queue information of the compute node 120.

In a possible embodiment, although the storage apparatus 112 in FIG. 1 is located in the compute node 110, and the storage apparatus 122 in FIG. 1 is located in the compute node 120, the storage apparatus 112 may also be a storage apparatus mounted to the compute node 110 or the RNIC 111, and the storage apparatus 122 may also be a storage apparatus mounted to the compute node 120 or the RNIC 121.

It may be understood that FIG. 1 shows only a connection relationship between two compute nodes that pass through a network device. Some networks (for example, a data center network) that support an RDMA technology may include more compute nodes. Any two compute nodes in a network that supports the RDMA technology may be connected through the method shown in FIG. 1. In other words, the system 100 shown in FIG. 1 may be a connection manner of any two compute nodes in the network that supports the RDMA technology.

One physical RNIC can be abstracted, through a hardware virtualization technology, as a plurality of vRNICs that support the RDMA technology. For ease of description, a virtual network interface card that supports the RDMA technology may be referred to as a vRNIC below. Unless otherwise specified, an RNIC in the embodiments of this application is a physical RNIC.

Figure 2:
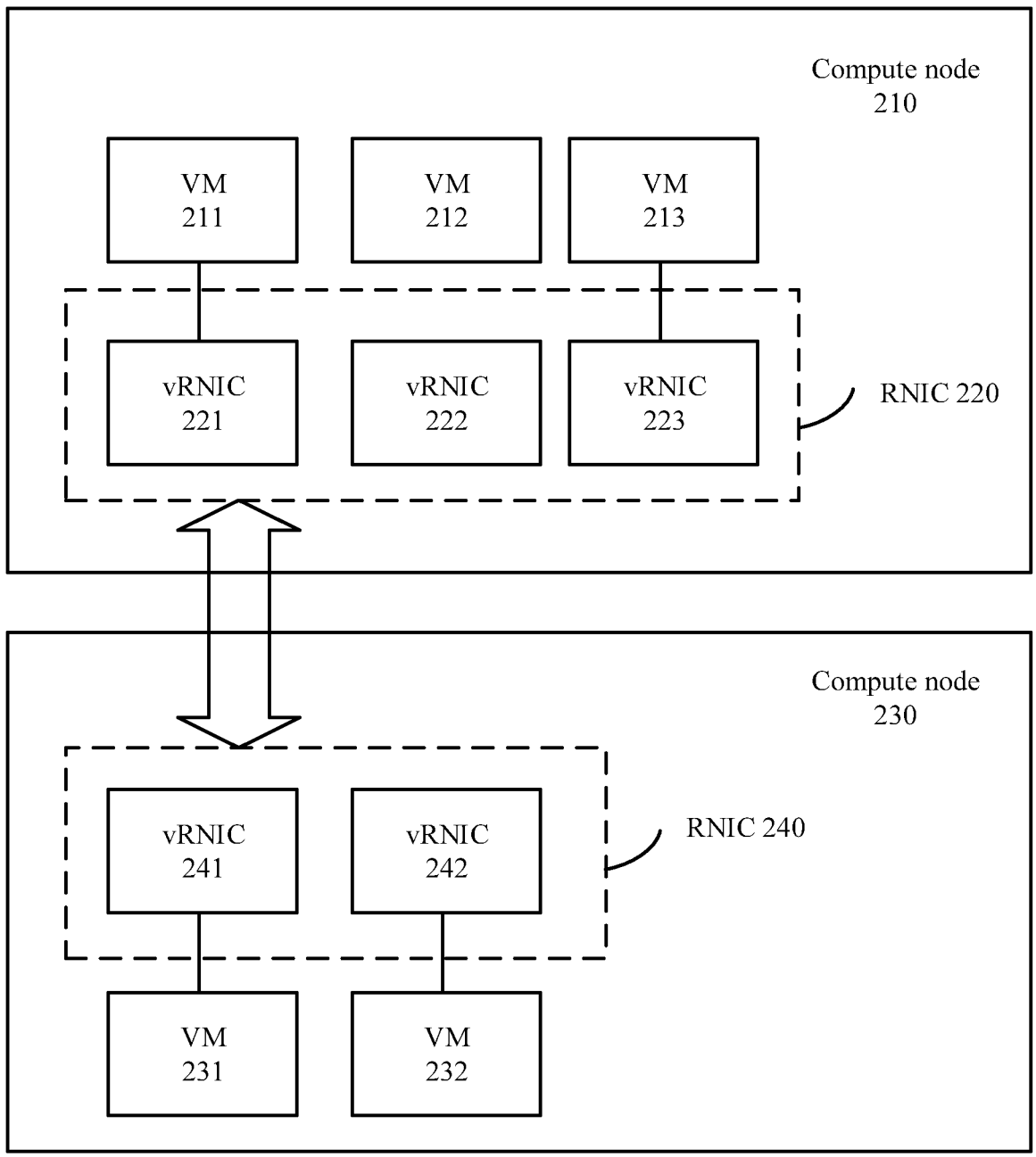
FIG. 2 is a schematic diagram of a system architecture according to an embodiment of this application.

FIG. 2 is a schematic diagram of a system architecture according to an embodiment of this application. Three VMs are deployed on a compute node 210 shown in FIG. 2 a VM 211, a VM 212, and a VM 213. Three vRNICs are deployed on an RNIC 220, a vRNIC 221, a vRNIC 222, and a vRNIC 223. Two VMs are deployed on a compute node 230, a VM 231 and a VM 232. Two vRNICs are deployed on an RNIC 240, a vRNIC 241 and a vRNIC 242. The RNIC 220 is an RNIC of the compute node 210, and the RNIC 240 is an RNIC of the compute node 230. In other words, the compute node 210 is a host of the RNIC 220, and the compute node 230 is a host of the RNIC 240.

The VMs deployed the compute node may be in a one-to-one correspondence with the vRNICs in the RNIC, or one VM may be configured with a plurality of vRNICs. For ease of description, in the system shown in FIG. 2, the three VMs deployed on the compute node 210 are in a one-to-one correspondence with the three vRNICs deployed on the RNIC 220. The two VMs deployed on the compute node 230 are in a one-to-one correspondence with the two vRNICs deployed on the RNIC 240. The one-to-one correspondence between a VM and a vRNIC herein means that the vRNIC is a vRNIC of a corresponding VM. For example, a vRNIC of the VM 211 is the vRNIC 221, and a vRNIC of the VM 231 is a vRNIC 241. RDMA communication between the VM 211 and the VM 231 may be implemented through the vRNIC 221 and the vRNIC 241.

It may be understood that, in the system shown in FIG. 2, it is assumed that a tenant is deployed in a VM. Therefore, FIG. 2 shows the correspondence between a VM and a vRNIC. In some other implementations, the tenant may be deployed in a container. In this case, each container has a corresponding vRNIC. RDMA communication between containers may be implemented through vRNICs that are respectively corresponding to the containers.

Figure 3:
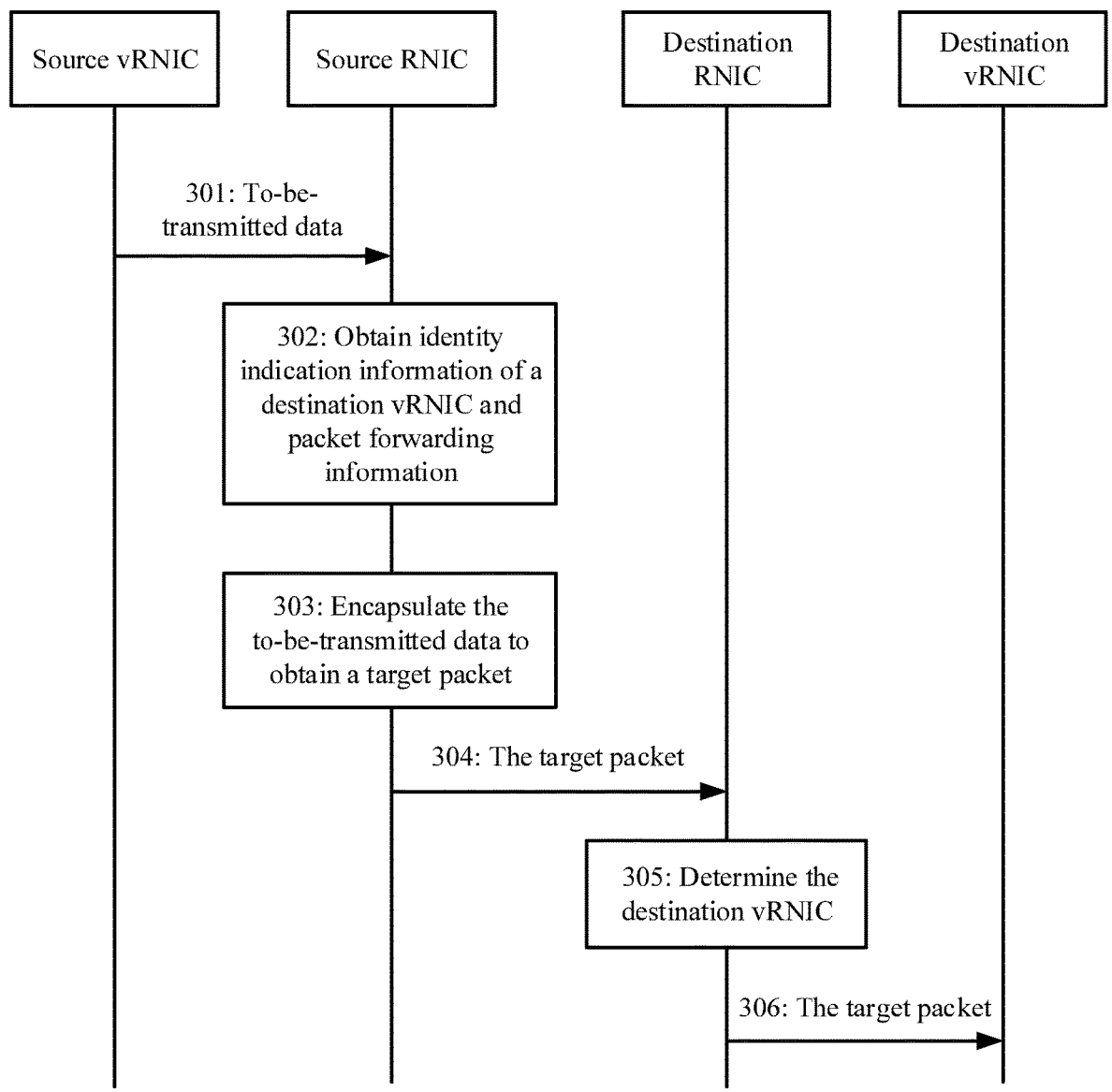
FIG. 3 is a schematic structural block diagram of a communication method according to an embodiment of this application.

FIG. 3 is a schematic structural block diagram of a communication method according to an embodiment of this application.

301. A source RNIC obtains to-be-transmitted data sent by a source vRNIC, where the source vRNIC is a vRNIC running on the source RNIC.

The to-be-transmitted data is data obtained by the source vRNIC from a storage apparatus of a host of the source vRNIC. It may be understood that the host of the source vRNIC is a VM deployed on a compute node. Therefore, the storage apparatus of the host of the source vRNIC is a storage apparatus of the compute node on which the VM is deployed.

302. The source RNIC obtains identity indication information of a destination vRNIC and packet forwarding information.

The packet forwarding information includes an IP address of the source RNIC, a MAC address of the source RNIC, layer 4 port numbers, an IP address of a destination RNIC, and a MAC address of the destination RNIC. More specifically, the packet forwarding information includes a MAC header, an IP header, and a layer 4 port number header. The MAC header includes the MAC address of the source RNIC and the MAC address of the destination RNIC. The IP header includes the IP address of the source RNIC and the IP address of the destination RNIC. The layer 4 port number header includes the layer 4 port numbers. A layer 4 is a fourth layer in an open systems interconnection (OSI) model, namely, a transport layer. Therefore, the layer 4 port numbers may also be referred to as transport protocol port numbers. The layer 4 port numbers may be user datagram protocol (UDP) port numbers, transmission control protocol (TCP) port numbers, or the like. The layer 4 port numbers may include a source port number and a destination port number.

Optionally, in some embodiments, that the source RNIC obtains identity indication information of a destination vRNIC and packet forwarding information includes the source RNIC obtains an identifier of the source vRNIC, and the source RNIC obtains the identity indication information of the destination vRNIC and the packet forwarding information based on the identifier of the source vRNIC and a transmission mode of the to-be-transmitted data.

The source RNIC may obtain the identifier of the source vRNIC by using a doorbell mechanism. When the source vRNIC needs to send data, the source vRNIC may notify, by using the doorbell mechanism, the source RNIC of a vRNIC that needs to send the data. The source RNIC may store data in a preset format in a register or storage space pre-agreed with the source vRNIC. When the source RNIC detects that content stored in the pre-agreed register or storage space changes, the source RNIC reads the data in the preset format from the pre-agreed register or storage space. In other words, in the foregoing doorbell mechanism, the data in the preset format may be stored by the preset register or storage space.

For example, the doorbell mechanism is implemented by the register. The source vRNIC may write the identifier of the source vRNIC into the register. After detecting a doorbell mechanism, the source RNIC may read a queue identifier that is in the register and that is of the source vRNIC, and record the read identifier of the source vRNIC.

Optionally, after reading the identifier that is in the register and that is of the source vRNIC and recording the read identifier of the source vRNIC, the source RNIC notifies the source vRNIC that the queue identifier stored in the register may be deleted. After obtaining a notification, the source vRNIC deletes the queue identifier stored in the register.

Optionally, the queue identifier may be stored in the register based on a first-in-first-out mechanism. In this way, after the queue identifier is read, the queue identifier is deleted from the register.

Data transmission between the source vRNIC and the destination vRNIC is implemented through an RDMA technology. A transmission mode of RDMA transmission may be one of a RC, a RD, an UC, or a UD. In other words, the transmission mode of the to-be-transmitted data may be one of the RC, the UC, the UD, or the RD.

The source RNIC may use different policies to obtain the identity indication information of the destination vRNIC and the packet forwarding information based on different transmission modes.

Optionally, in some embodiments, when the transmission mode is the RC or the UC, the source RNIC may obtain connection information. The source RNIC may determine a target QPC corresponding to the connection information and the identifier of the source vRNIC. The source RNIC may determine, from the target QPC, the identity indication information of the destination vRNIC and the packet forwarding information.

The connection information is information used to indicate a queue. For example, in some embodiments, the connection information may be a queue pair number (QPn). For another example, in some other embodiments, the connection information may be other information that may indicate a queue pair. Different queue pairs may be corresponding to different identifiers. The connection information may be an identifier of a queue. The connection information may be an identifier of a communication endpoint, for example, an identifier of a receive end. The receive end may be an identifier of the destination vRNIC, or may be an identifier of a VM corresponding to the destination vRNIC.

The source RNIC may alternatively obtain the QPn by using the doorbell mechanism. A specific implementation is the same as a manner in which the source RNIC obtains the identifier of the source vRNIC by using the doorbell mechanism. For brevity, details are not described herein again.

As described above, there may be a plurality of vRNICs running in the source RNIC. The source vRNIC is only one of the plurality of vRNICs. Different vRNICs may have a same QPn. However, different vRNICs have different identifiers. Therefore, a unique QPC, namely, the target QPC, may be determined based on the QPn and the identifier of the source vRNIC.

Optionally, in some embodiments, the target QPC may include the packet forwarding information. In other words, the source RNIC may directly obtain the packet forwarding information from the target QPC.

Optionally, in some other embodiments, the target QPC may include an address of the packet forwarding information. The source RNIC may obtain the packet forwarding information based on the address of the packet forwarding information.

Optionally, in some other embodiments, the target QPC may include a part of information of the packet forwarding information and an address of another part of information of the packet forwarding information. In this way, the source RNIC may directly obtain a part of the packet forwarding information from the target QPC, and then obtain another part of the packet forwarding information based on the address in the target QPC.

Optionally, in some embodiments, when the transmission mode is the RC or the UC, the source RNIC may obtain connection information. The source RNIC may determine a reference QPC or a reference WQE corresponding to the connection information and the identifier of the source vRNIC. The source RNIC determines a target virtual network address from the reference QPC or the reference WQE. The target virtual network address includes at least one of the IP address of the source vRNIC and the IP address of the destination vRNIC. The source RNIC determines, from a tunnel table, the identity indication information of the destination vRNIC and the packet forwarding information. The tunnel table includes at least one tunnel entry, and each tunnel entry in the at least one tunnel entry is used to indicate an identifier of a first vRNIC, a VNI to which a second vRNIC belongs, a virtual network address, address information of a first RNIC, and address information of a second RNIC. The first vRNIC runs in the first RNIC, and the second vRNIC runs in the second RNIC. The virtual network address includes at least one of an IP address of the first vRNIC and an IP address of the second vRNIC, and a tunnel entry that is in the at least one tunnel entry and that matches the identifier of the source vRNIC and the target virtual network address includes the packet forwarding information.

As described above, there may be a plurality of vRNICs running in the source RNIC. The source vRNIC is only one of the plurality of vRNICs. Different vRNICs may have a same QPn. However, different vRNICs have different identifiers. Therefore, a unique QPC, namely, the reference QPC, may be determined based on the QPn and the identifier of the source vRNIC. Similarly, the source RNIC may determine a unique WQE, namely, the reference WQE.

Optionally, in some embodiments, when the transmission mode is the UD or the RD, the source RNIC determines a target virtual network address based on a target WQE corresponding to the to-be-transmitted data and the identifier corresponding to the source vRNIC, or determines, based on the target WQE, the target virtual network address. The target virtual network address includes at least one of the IP address of the source vRNIC and the IP address of the destination vRNIC. The source RNIC determines, from a tunnel table, the identity indication information of the destination vRNIC and the packet forwarding information. The tunnel table includes at least one tunnel entry, and each tunnel entry in the at least one tunnel entry is used to indicate an identifier of a first vRNIC, a VNI to which a second vRNIC belongs, a virtual network address, address information of a first RNIC, and address information of a second RNIC. The first vRNIC runs in the first RNIC, and the second vRNIC runs in the second RNIC. The virtual network address includes at least one of an IP address of the first vRNIC and an IP address of the second vRNIC, and a tunnel entry that is in the at least one tunnel entry and that matches the identifier of the source vRNIC and the target virtual network address includes the packet forwarding information.

Optionally, in some embodiments, that a tunnel entry is used to indicate an identifier of a first vRNIC, a VNI to which a second vRNIC belongs, a virtual network address, address information of a first RNIC, and address information of a second RNIC may be the tunnel entry includes the identifier of the first vRNIC, the VNI to which the second vRNIC belongs, the virtual network address, the address information of the first RNIC, and the address information of the second RNIC.

Optionally, in some other embodiments, that a tunnel entry is used to indicate an identifier of a first vRNIC, a VNI to which a second vRNIC belongs, a virtual network address, address information of a first RNIC, and address information of a second RNIC may be the tunnel entry includes location indication information (which may also be referred to as a pointer), and the location indication information is used to indicate locations and lengths of the identifier of the first vRNIC, the VNI to which the second vRNIC belongs, the virtual network address, the address information of the first RNIC, and the address information of the second RNIC that are in the storage apparatus. The identifier of the first vRNIC, the VNI to which the second vRNIC belongs, the virtual network address, the address information of the first RNIC, and the address information of the second RNIC may be read from the locations indicated by the location indication information.

For ease of description, the following uses an example, for description, in which the tunnel entry includes the identifier of the first vRNIC, the VNI to which the second vRNIC belongs, the virtual network address, the address information of the first RNIC, and the address information of the second RNIC.

Optionally, in some embodiments, a WQE may carry data. In this case, the target WQE may be a WQE that carries the to-be-transmitted data.

Optionally, in some other embodiments, a WQE may carry location indication information. The location indication information is used to indicate a storage location and a length that are of data in a host. In this case, the target WQE may be a WQE that carries location indication information indicating a storage location of the to-be-transmitted data.

It can be learned that when the transmission mode is the RC, the UC, the UD, or the RD, the source RNIC may determine, by using the tunnel table, the identity indication information of the destination vRNIC and the packet forwarding information that are in packet encapsulation information.

The address information that is of the first RNIC and that is in each tunnel entry in the tunnel table may include an IP address and a MAC address of the first RNIC. The address information of the second RNIC may include an IP address and a MAC address of the second RNIC. The virtual network address may include at least one of the IP address of the first vRNIC and the IP address of the second vRNIC.

As described above, each tunnel entry includes related information of the first vRNIC (namely, the identifier of the first vRNIC and the IP address of the first vRNIC) and related information of the second vRNIC (namely, the VNI to which the second vRNIC belongs and the IP address of the second vRNIC). However, "first" and "second" herein are merely intended to distinguish related information that is of two different vRNICs and that each tunnel entry includes, and are not intended to limit to that related information of two first vRNICs that respectively belong to any two tunnel entries in the tunnel table is related information of a same vRNIC, and that related information of two second vRNICs included in the any two tunnel entries is related information of a same vRNIC. Related information of two first vRNICs that respectively belong to any two tunnel entries in the tunnel table may be related information of a same vRNIC, or may be related information of different vRNICs. Related information of two second vRNICs that respectively belong to any two tunnel entries in the tunnel table may be related information of a same vRNIC, or may be related information of different vRNICs.

Similarly, each tunnel entry further includes related information of the first RNIC (namely, the address information of the first RNIC) and related information of the second RNIC (namely, the address information of the second RNIC). "First" and "second" herein are also intended to distinguish related information that is of two different RNICs and that each tunnel entry includes, and are not intended to limit to that related information of two first RNICs that respectively belong to any two tunnel entries in the tunnel table is related information of a same RNIC, and that related information of two second RNICs that respectively belong to the any two tunnel entries is related information of a same RNIC. Related information of two first RNICs that respectively belong to any two tunnel entries in the tunnel table may be related information of a same RNIC, or may be related information of different RNICs. Related information of two second RNICs that respectively belong to any two tunnel entries in the tunnel table may be related information of a same RNIC, or may be related information of different RNICs.

The tunnel entry that is in the at least one tunnel entry and that matches the identifier of the source vRNIC and the target virtual network address may be referred to as a target tunnel entry. For the target tunnel entry, a first vRNIC in the target tunnel entry is the source vRNIC, and a second vRNIC in the target tunnel entry is the destination vRNIC. A first RNIC in the target tunnel entry is the source RNIC, and a second RNIC in the target tunnel entry is the destination RNIC. Therefore, an identifier of the first vRNIC in the target tunnel entry is the identifier of the source vRNIC. A VNI to which the second vRNIC in the target tunnel entry belongs is a VNI to which the destination vRNIC belongs. A virtual network address in the target tunnel entry is the target virtual network address. Address information of the first RNIC in the target tunnel entry includes the IP address and the MAC address that are of the source RNIC. Address information of the second RNIC in the target tunnel entry includes the IP address and the MAC address that are of the destination RNIC.

Optionally, in some embodiments, the address information of the first RNIC may further include a port number of the first RNIC, and the address information of the second RNIC may further include a port number of the second RNIC.

Table 1 is an example of a tunnel table.

TABLE 1

| Identifier of a first vRNIC | VNI to which a second vRNIC belongs | IP address of the first vRNIC | IP address of the second vRNIC | Address information of a first RNIC | Address information of a second RNIC |
|---|---|---|---|---|---|
| vRNIC 1 | VNI = 1001 | 10.1.1.1 | 10.1.1.11 | IP = 192.100.1.1, MAC = X:Y:Z:M:N:11 | IP = 192.100.2.2, MAC = M:N:X:Y:Z:22 |
| vRNIC 1 | VNI = 1001 | 10.1.1.1 | 10.1.1.12 | IP = 192.100.1.1, MAC = X:Y:Z:M:N:11 | IP = 192.100.2.2, MAC = M:N:X:Y:Z:22 |
| vRNIC 1 | VNI = 1001 | 10.1.1.1 | 10.1.1.13 | IP = 192.100.1.1, MAC = X:Y:Z:M:N:11 | IP = 192.100.2.2, MAC = M:N:X:Y:Z:22 |
| vRNIC 2 | VNI = 1001 | 10.1.1.2 | 10.1.1.21 | IP = 192.100.1.1, MAC = X:Y:Z:M:N:11 | IP = 192.100.3.3, MAC = M:N:X:Y:Z:33 |
| vRNIC 2 | VNI = 1001 | 10.1.1.2 | 10.1.1.22 | IP = 192.100.1.1, MAC = X:Y:Z:M:N:11 | IP = 192.100.3.3, MAC = M:N:X:Y:Z:33 |

The tunnel table shown in Table 1 includes five tunnel entries. It is assumed that the identifier of the source vRNIC is the vRNIC 1, the IP address of the source vRNIC is 10.1.1.1, and the IP address of the destination vRNIC is 10.1.1.11. In this case, a first tunnel entry of the five tunnel entries shown in Table 1 is a target tunnel entry that matches the identifier of the source vRNIC, the IP address of the source vRNIC, and the IP address of the destination vRNIC. The VNI to which the destination vRNIC belongs may be determined based on the target tunnel entry. The IP address of the source RNIC is 192.100.1.1, and the MAC address of the source RNIC is X:Y:Z:M:N:11. The IP address of the destination RNIC is 192.100.2.2, and the MAC address of the destination RNIC is M:N:X:Y:Z:22. The VNI to which the destination vRNIC belongs is 1001.

Optionally, in some embodiments, the tunnel table may be stored in a cache of a processing circuit of the source RNIC.

Optionally, in some other embodiments, the tunnel table may be stored in a memory of the source RNIC.

Optionally, in some other embodiments, the tunnel table may be stored in a storage apparatus of a host in which the source RNIC is installed.

Optionally, in some other embodiments, the tunnel table may be divided into three parts. A first part of the tunnel table may be stored in a cache of a processor of the source RNIC, a second part of the tunnel table may be stored in a memory of the source RNIC, and a third part of the tunnel table may be stored in a storage apparatus of a host of the source RNIC. In this case, the source RNIC may first check whether the first part of the tunnel table includes the target tunnel entry. If the first part of the tunnel table does not include the target tunnel entry, the source RNIC may check whether the second part of the tunnel table includes the target tunnel entry. If the second part of the tunnel table does not include the target tunnel entry, the source RNIC may check whether the third part of the tunnel table includes the target tunnel entry. Any two of the first part of the tunnel table, the second part of the tunnel table, and the third part of the tunnel table may have an intersection set, or may have no intersection set. For example, it is assumed that the tunnel table includes 100 tunnel entries in total. The first part of the tunnel table may include the 1st to the 10th tunnel entries in the 100 tunnel entries. The second part of the tunnel table may include the 11th to the 40th tunnel entries in the 100 tunnel entries. The third part of the tunnel table may include the 41st to the 100th tunnel entries in the 100 tunnel entries. For another example, the first part of the tunnel table may be a subset of the second part of the tunnel table and/or the third part of the tunnel table, and/or the second part of the tunnel table may be a subset of the third part of the tunnel table. For example, it is further assumed that the tunnel table includes 100 tunnel entries in total. The first part of the tunnel table may include the 1st to the 10th tunnel entries in the 100 tunnel entries. The second part of the tunnel table may include the 1st to the 40th tunnel entries in the 100 tunnel entries. The third part of the tunnel table may include the 1st to the 100th tunnel entries in the 100 tunnel entries.

Optionally, in some other embodiments, the tunnel table may be divided into two parts. The two parts of tunnel tables may be stored in any two of a cache of a processor of the source RNIC, a memory of the source RNIC, and a storage apparatus of a host of the source RNIC. Similarly, if the two parts of tunnel tables are stored in the cache of the processor of the source RNIC and the memory of the source RNIC, the source RNIC may first check whether a tunnel table stored in the cache of the processor of the source RNIC includes the target tunnel entry. If the tunnel table stored in the cache of the processor of the source RNIC does not include the target tunnel entry, the source RNIC may check whether a tunnel table stored in the memory of the source RNIC includes the target tunnel entry. If the two parts of tunnel tables are stored in the memory of the source RNIC and the storage apparatus of the host of the source RNIC, the source RNIC may first check whether a tunnel table stored in the memory of the source RNIC includes the target tunnel entry. If the tunnel table stored in the memory of the source RNIC does not include the target tunnel entry, the source RNIC may check whether a tunnel table stored in the storage apparatus of the host of the source RNIC includes the target tunnel entry. Similarly, the two parts of tunnel tables may have an intersection set, or may have no intersection set.

Optionally, in some embodiments, the source RNIC may determine a target configuration entry corresponding to the identifier of the source vRNIC, and determine the target virtual network address based on the target configuration entry and the target WQE corresponding to the to-be-transmitted data. Optionally, the source RNIC may determine, from the target WQE, the IP address of the destination vRNIC, and determine, from the target configuration entry, the IP address of the source vRNIC.

Optionally, in some embodiments, the target WQE may include the IP address of the destination vRNIC. In this way, the source RNIC may directly obtain, from the target WQE, the IP address of the destination vRNIC. In some other embodiments, the target WQE may include IP address indication information of the destination vRNIC. The IP address indication information of the destination vRNIC is used to indicate a location at which the IP address of the destination vRNIC is stored. The source RNIC may obtain the IP address of the destination vRNIC based on the location indicated by the IP address indication information of the destination vRNIC.

The target configuration entry is an entry in a configuration table. The configuration table is used to store a correspondence between an identifier of a vRNIC and an IP address of the vRNIC. The configuration table may include at least one configuration entry. Each of the at least one configuration entry includes the identifier of the vRNIC and the IP address of the vRNIC. The source RNIC may search, by using the identifier of the source vRNIC, the configuration table for the target configuration entry corresponding to the identifier of the source vRNIC. The identifier of the vRNIC in the target configuration entry is the identifier of the source vRNIC, and the IP address in the target configuration entry is the IP address of the source vRNIC.

A storage location of the configuration table may be similar to a storage location of the tunnel table. In other words, the configuration table may be stored in any one or more of the cache of the processor of the source RNIC, the memory of the source RNIC, and the storage apparatus of the host of the source RNIC. For a specific storage manner of the configuration table and a manner in which the source RNIC searches the configuration table, refer to the foregoing manner in which the tunnel table is stored and the foregoing manner in which the source RNIC searches the tunnel table. For brevity, details are not described herein again.

As described above, when the transmission mode is the UD or the RD, the source RNIC may determine the target virtual network address based on the target WQE.

Optionally, in some embodiments, the target WQE may include the IP address of the source vRNIC and the IP address of the destination vRNIC. In this way, the source RNIC may directly obtain, from the target WQE, the IP address of the source vRNIC and the IP address of the destination vRNIC. In some other embodiments, the target WQE may include virtual address indication information. The virtual address indication information is used to indicate a location at which the IP address of the source vRNIC is stored and the location at which the IP address of the destination vRNIC is stored. The source RNIC may obtain, based on the locations indicated by the virtual address indication information, the IP address of the source vRNIC and the IP address of the destination vRNIC.

For ease of description, a manner in which the packet forwarding information is determined through the QPC is referred to as a QPC cache mode for short in the following, and a manner in which the packet forwarding information is determined through the tunnel table may be referred to as a table lookup mode.

It can be learned that, the source vRNIC may determine, based on the transmission mode, the packet forwarding information from different places.

Optionally, in some embodiments, the source RNIC may be unable to determine, by using the QPC cache mode or the table lookup mode, the packet forwarding information and the identity indication information of the destination vRNIC. In other words, the source RNIC may determine that there is no target QPC corresponding to the connection information and the identifier of the source vRNIC, or determine that there is no target tunnel entry that matches the identifier of the source vRNIC and the target virtual network address. As described above, the packet forwarding information includes the IP address of the source RNIC, the MAC address of the source RNIC, the layer 4 port numbers, the IP address of the destination RNIC, and the MAC address of the destination RNIC. The IP address of the source RNIC, the MAC address of the source RNIC, and the layer 4 port numbers may all be stored in the storage apparatus of the source RNIC. Therefore, the source RNIC can directly obtain the information. Therefore, the IP address of the destination RNIC and the MAC address of the destination RNIC are not stored in the source RNIC or the host of the source RNIC. In this case, the source RNIC may obtain, by using a slow processing procedure, the IP address of the destination RNIC and the MAC address of the destination RNIC. For ease of description, the IP address of the destination RNIC and the MAC address of the destination RNIC may be referred to as address information of the destination RNIC, and the IP address of the source RNIC and the MAC address of the source RNIC may be referred to as address information of the source RNIC.

Optionally, in some embodiments, the source RNIC may obtain the identifier of the source vRNIC and a VNI corresponding to the identifier of the source vRNIC. The source RNIC may send a request message to at least one target network interface card. Each target network interface card in the at least one target network interface card runs at least one vRNIC that belongs to the VNI. The request message includes the identifier of the source vRNIC and the target virtual network address. The target virtual network address includes at least one of the IP address of the source vRNIC and the IP address of the destination vRNIC. The source RNIC receives feedback information sent by the destination RNIC. The feedback information includes the address information of the destination RNIC.

Optionally, in some embodiments, the storage apparatus of the host of the source RNIC or the source RNIC may store the IP address of the destination RNIC and a port number of the destination RNIC, but does not store the MAC address of the destination RNIC. In this case, the source RNIC may only need to obtain the MAC address of the destination RNIC. In this case, the source RNIC may obtain the MAC address of the destination RNIC by using an address resolution protocol (ARP). The source RNIC may obtain the VNI corresponding to the identifier of the source vRNIC, broadcast an ARP request to all vRNICs that belong to the VNI, and receive an ARP response sent by the destination vRNIC. The ARP response includes the MAC address of the destination vRNIC.

After obtaining the address information of the destination RNIC, the source RNIC may encapsulate the to-be-transmitted data based on the address information of the destination RNIC and the address information of the source RNIC. In addition, after obtaining the address information of the destination RNIC and the address information of the source RNIC, the source RNIC adds a corresponding tunnel entry to the tunnel table.

The source RNIC can further maintain the tunnel table. For example, the source RNIC may set a timeout period, and start a timer after a tunnel entry is written to the tunnel table. Each time the keyword of the tunnel entry is matched successfully, the timer is restarted. If the time period of the timer exceeds the timeout period and the tunnel entry is not hit, the tunnel entry is deleted.

The identity indication information of the destination vRNIC is used to indicate an identity of the destination vRNIC.

Optionally, in some embodiments, the identity indication information of the destination vRNIC may include the VNI to which the destination vRNIC belongs and the virtual MAC address of the destination vRNIC.

Optionally, in some other embodiments, the identity indication information of the destination vRNIC may include a number of the destination vRNIC. A number of a vRNIC may be a virtual function identification (VFID).

The VNI to which the destination vRNIC belongs may be obtained from the target QPC or the target tunnel entry. In other words, if the packet forwarding information is determined through the QPC cache mode, the source RNIC may further determine, from the target QPC, the VNI to which the destination vRNIC belongs. If the packet forwarding information is determined through the table lookup mode, the source RNIC may further determine, from the target tunnel entry, the VNI to which the destination vRNIC belongs.

The IP address of the destination vRNIC may be obtained from a correspondence table that is between an IP address of a vRNIC and a MAC address of the vRNIC, and that is stored in the source RNIC. The source RNIC may store the correspondence table between an IP address and a MAC address. The correspondence table includes a plurality of entries, and each entry includes an IP address and a MAC address. The source RNIC may query the correspondence table based on the IP address that is of the destination vRNIC and that is obtained from the target QPC or the target tunnel entry, to determine that a MAC address in a matching entry (that is, the IP address is an entry of the destination vRNIC) in the correspondence table is the MAC address of the destination vRNIC.

Optionally, in some embodiments, each entry in the correspondence table may further include a VNI to which the vRNIC belongs. In other words, the source RNIC may determine, based on the IP address of the destination vRNIC and by using the correspondence table, the MAC address and the VNI of the destination vRNIC.

Optionally, in some other embodiments, the identity indication information of the destination vRNIC may include the identifier of the destination vRNIC. The identity indication information of the destination vRNIC may be obtained from a correspondence table that is between an IP address of a vRNIC and an identifier of the vRNIC, and that is stored in the source RNIC. The source RNIC may store the correspondence table between an IP address and an identifier. The correspondence table includes a plurality of entries, and each entry includes an IP address and an identifier. The source RNIC may query the correspondence table based on the IP address that is of the destination vRNIC and that is obtained from the target QPC or the target tunnel entry, to determine that an identifier in a matching entry (that is, the IP address is an entry of the destination vRNIC) in the correspondence table is the identifier of the destination vRNIC. Optionally, in some embodiments, each entry in the correspondence table may further include a VNI to which the vRNIC belongs. In other words, the source RNIC may determine, based on the IP address of the destination vRNIC and by using the correspondence table, the identifier and the VNI of the destination vRNIC.

303. The source RNIC encapsulates the to-be-transmitted data to obtain a target packet.

The target packet includes the packet encapsulation information and the to-be-transmitted data. The packet encapsulation information includes the packet forwarding information and the identity indication information of the destination vRNIC. The packet forwarding information and the identity indication information of the destination vRNIC are obtained in step 302. In other words, the source RNIC may encapsulate the to-be-transmitted data by using the obtained packet forwarding information and the obtained identity indication information of the destination vRNIC, to obtain the target packet.

Optionally, in some embodiments, the target packet may further include identity indication information of the source vRNIC.

The packet encapsulation information may further include INFINIBAND (IB) information.

Figure 4:
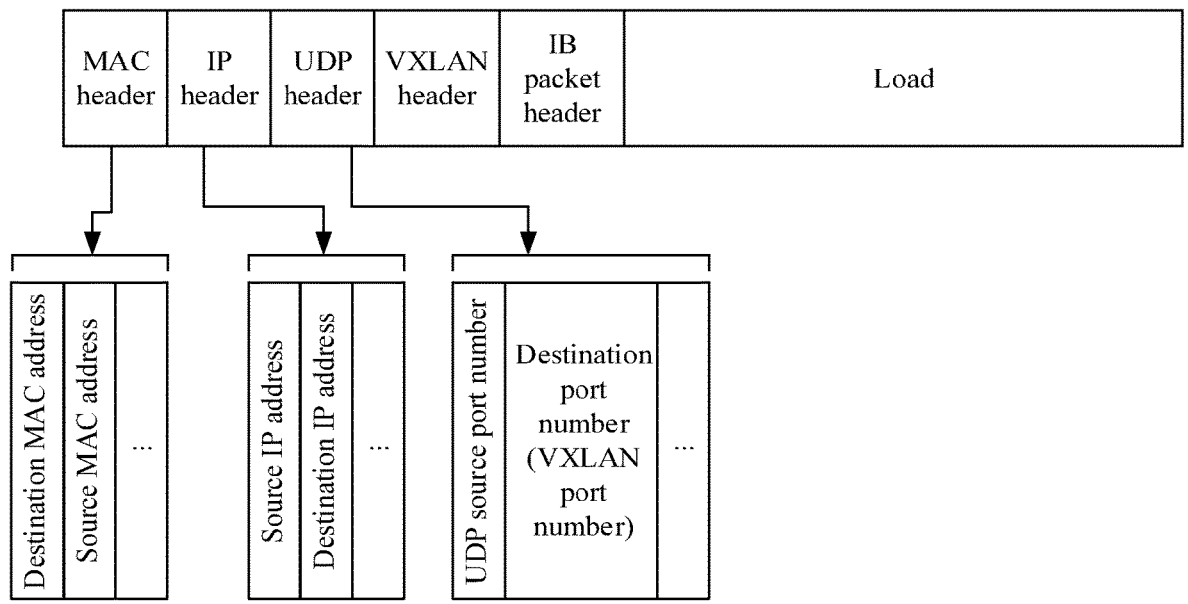
FIG. 4 is a schematic diagram of a target packet.

FIG. 4 is a schematic diagram of a target packet. The target packet shown in FIG. 4 includes a MAC header (which may also be referred to as an "outer MAC header"), an IP header (which may also be referred to as an "outer IP header"), a UDP header, a VXLAN header, an IB packet header, and a payload.

As shown in FIG. 4, the MAC header includes a source MAC address and a destination MAC address. The source MAC address is the MAC address of the source RNIC, and the destination MAC address is the MAC address of the destination RNIC. The IP header includes a source IP address and a destination IP address. The source IP address is the IP address of the source RNIC, and the destination IP address is the IP address of the destination RNIC. A layer 4 port number header in FIG. 4 is the UDP header. The UDP header includes a UDP source port number and a UDP destination port number, and the destination port number is a VXLAN port number. The UDP source port number may be a value calculated according to a hash algorithm. A manner in which the UDP source port number is determined is the same as a manner in which an existing UDP source port number is determined, and details are not described herein. The VXLAN header includes the identity indication information of the destination vRNIC. The IB header includes the IB information. The IB information may be an IB base transport header (BTH). It may be understood that the target packet may further include a check bit, for example, a frame check sequence (FCS) (not shown in the figure).

Optionally, in some embodiments, the VXLAN header may further include the identity indication information of the source vRNIC.

Optionally, in some embodiments, the identity indication information of the source vRNIC may include a VNI to which the source vRNIC belongs and a virtual MAC address of the source vRNIC.

Optionally, in some other embodiments, the identity indication information of the source vRNIC may include a number of the source vRNIC.

Optionally, in some embodiments, the target packet may include at least one of the identity indication information of the source vRNIC and the identity indication information of the destination vRNIC. In this case, the VXLAN header may include at least one of the identity indication information of the source vRNIC and the identity indication information of the destination vRNIC.

In addition to content shown in FIG. 4, the MAC header, the IP header, and the UDP header further include other content. The content is not improved in this embodiment of this application. Therefore, for specific formats and content of the MAC header, the IP header, and the UDP header, refer to an existing protocol. For brevity, details are not described herein.

Information transmitted in the IB header is not improved in the technical solution of this application. Therefore, for specific information transmitted in the IB header, refer to an IB header specified in an existing RoCE protocol. For brevity, details are not described herein.

In addition to the fields shown in FIG. 4, the target packet may further include a check field (not shown in the figure). A determining manner and specific content of the check field are the same as a determining manner and specific content of a check field in an RoCE packet. For brevity, details are not described herein.

The target packet may be a packet based on an RoCE standard format packet.

For example, the target packet shown in FIG. 4 is a packet based on an RoCE version 2 (v2) packet. It can be learned that the target packet shown in FIG. 4 has only one more network virtualization protocol header (namely, the VXLAN header in FIG. 4) than the RoCEv2 packet. For another example, the target packet may alternatively be a packet based on an RoCE version 1 (v1) packet. In this case, the target packet may have one more network virtualization protocol header than the RoCEv1 packet.

Optionally, in some embodiments, the target packet does not include at least one piece of the following information: the IP address of the source vRNIC, the IP address of the destination vRNIC, the MAC address of the source vRNIC, a port number of the source vRNIC, and a port number of the destination vRNIC.

Optionally, in some embodiments, the target packet does not include the IP address of the source vRNIC, the IP address of the destination vRNIC, the MAC address of the source vRNIC, a port number of the source vRNIC, and a port number of the destination vRNIC.

If the target packet includes the foregoing information, the source RNIC further needs to encapsulate the foregoing information into the target packet as an inner packet header. In this way, packet encapsulation is performed again. In addition, the foregoing information further occupies a capacity of the target packet. In other words, if the target packet further needs to include one or more pieces of the foregoing information, a field that is in the target packet and that is used to carry to-be-transmitted data is reduced. In other words, a capacity of the payload of the target packet is reduced. Two packets may be required to complete transmission of to-be-transmitted data of a same size. This increases a quantity of packets transmitted on a network.

The source RNIC may obtain the IB information from the QPC or the WQE. Specifically, when the transmission mode is the RC/UC, the source RNIC may obtain the IB information from the target QPC. When the transmission mode is the UD/RD, the source RNIC may obtain the IB information from the reference WQE. A specific implementation of obtaining the IB information by the source RNIC is the same as an existing specific implementation of obtaining IB information. For brevity, details are not described herein.

304. The source RNIC sends the target packet to a destination RNIC, where the destination vRNIC is a vRNIC running on the destination RNIC. Correspondingly, the destination RNIC receives the target packet.

305. The destination RNIC determines the destination vRNIC based on the identity indication information of the destination vRNIC in the target packet.

The identity indication information of the destination vRNIC in the target packet may be carried in a network virtualization protocol header.

Optionally, in some embodiments, the identity indication information of the destination vRNIC may include the VNI to which the destination vRNIC belongs and the virtual MAC address of the destination vRNIC. The network virtualization protocol header may carry the VNI to which the destination vRNIC belongs and the virtual MAC address of the destination vRNIC.

Optionally, in some other embodiments, the identity indication information of the destination vRNIC may be the number of the destination vRNIC. The network virtualization protocol header may carry the number of the destination vRNIC.

Optionally, in some embodiments, the network virtualization protocol header may be one of a VXLAN header (as shown in FIG. 4), a VXLAN-GPE header, a network service header, and a generic network virtualization encapsulation (Geneve) header.

Figure 5:
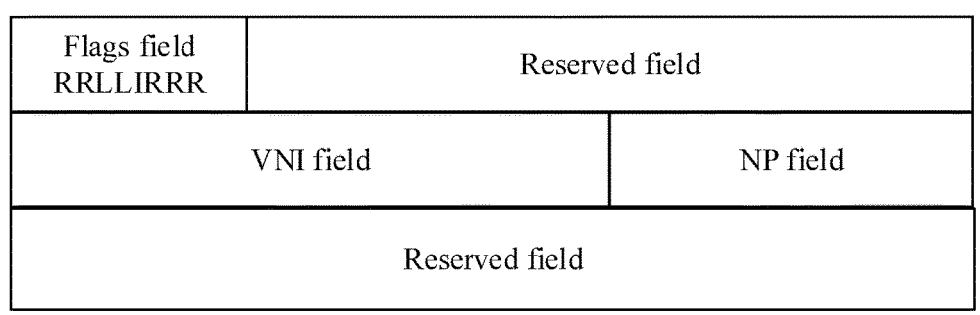
FIG. 5 is a schematic diagram of a VXLAN-generic protocol extension (GPE) header.

In FIG. 5, the VXLAN-GPE header is used as an example to describe how to use the VXLAN-GPE header to carry the VNI to which the destination vRNIC belongs and the virtual MAC address of the destination vRNIC.

The VXLAN-GPE header shown in FIG. 5 includes a flags field, a reserved field, a VNI field, a next protocol (NP) field, and a reserved field.

The flags field shown in FIG. 5 is RRLLIRRR. R indicates that a bit is a reserved bit, L indicates that a bit is an indication bit used to indicate a VXLAN-GPE format, and I indicates a bit that has been occupied by the VXLAN-GPE. It may be understood that the flags field shown in FIG. 5 occupies significant second and third bits as indication bits of the VXLAN-GPE format. In some other embodiments, another reserved bit of the flags field may alternatively be used as the indication bit of the VXLAN-GPE format. Optionally, in some embodiments, if a value of LL bits is 01, this indicates that the VXLAN-GPE header includes the identity indication information of the destination vRNIC. The VNI field in the VXLAN-GPE header may carry the VNI to which the destination vRNIC belongs. The second reserved field in the VXLAN-GPE header may carry the MAC address of the destination vRNIC.

It is assumed that a value of the significant second and third bits (namely, the LL bits in FIG. 5) in the flags field in the VXLAN-GPE header is 01, after receiving the target packet, the destination RNIC may determine, based on the significant second and third bits in the flags field in the VXLAN-GPE header, that the VXLAN-GPE header carries the identity indication information of the destination vRNIC, and separately obtain, from the VNI field and the second reserved field in the VXLAN-GPE header, the VNI to which the destination vRNIC belongs and the MAC address of the destination vRNIC.

Optionally, that the destination RNIC may determine the destination vRNIC based on the identifier of the destination vRNIC.

The destination RNIC may determine the identifier of the destination vRNIC based on the obtained VNI and the obtained MAC address. An identifier of a vRNIC is allocated by an RNIC to which the vRNIC belongs. After the vRNIC is migrated to another RNIC, the identifier of the vRNIC changes. However, a VNI to which the vRNIC belongs and a MAC address of the vRNIC do not change. Therefore, the VNI to which the destination vRNIC belongs and the MAC address of the destination vRNIC are used as the identity indication information of the destination vRNIC, to avoid a case in which the destination vRNIC cannot be accurately found because the identifier of the destination vRNIC changes due to migration of the destination vRNIC.

The destination RNIC may determine the identifier of the destination vRNIC by searching a virtual device mapping table. The virtual device mapping table includes at least one virtual device entry, and each entry includes a VNI, a MAC address, and an identifier. The destination RNIC may determine, from the virtual device mapping table, a target virtual device entry that matches the obtained VNI and the obtained MAC address. A VNI in the target virtual device entry is the VNI that is obtained by the destination RNIC and to which the destination vRNIC belongs. A MAC address in the target virtual entry is the MAC address that is obtained by the destination RNIC and that is of the destination vRNIC. Correspondingly, an identifier in the target virtual entry is the identifier of the destination vRNIC.

The destination RNIC may maintain the virtual device mapping table. Specifically, when a vRNIC is created in the destination RNIC, the destination RNIC may create, in the virtual device mapping table, a virtual device entry corresponding to the vRNIC. A VNI in the virtual device entry is a VNI to which the vRNIC belongs. A MAC address in the virtual device entry is a MAC address of the vRNIC. An identifier in the virtual device entry is an identifier of the vRNIC. The destination RNIC may further delete the virtual device entry corresponding to the vRNIC after the vRNIC is destroyed (for example, the vRNIC is migrated to another RNIC or deleted from the destination RNIC).

Optionally, in some other embodiments, the identity indication information of the destination vRNIC may be the identifier of the destination vRNIC. Similarly, the identifier of the destination vRNIC may also be carried by the network virtualization protocol header. The VXLAN-GPE header shown in FIG. 4 is further used as an example. The second reserved field in the VXLAN-GPE header may carry the identifier of the destination vRNIC. The significant second and third bits in the flags field in the VXLAN-GPE header may also be used to indicate that the VXLAN-GPE header carries the identity indication information of the destination vRNIC. In this way, the destination RNIC may directly determine the identifier of the destination vRNIC from the VXLAN-GPE header.

306. The destination RNIC sends the target packet to the destination vRNIC. The destination vRNIC processes the received target packet.

Specifically, the destination vRNIC may remove, from the target packet, the packet forwarding information, the identity indication information of the destination vRNIC, and the IB information, and process data (namely, the to-be-transmitted data sent by the source vRNIC) in a payload part of the target packet. A specific process in which the destination vRNIC processes the to-be-transmitted data is the same as an existing process in which a vRNIC processes data transmitted through the RDMA technology. For brevity, details are not described herein.

According to the method shown in FIG. 3, the packet encapsulation may be performed only once on the to-be-transmitted data. Therefore, overheads of tunnel encapsulation are relatively low. An encapsulated packet does not need to include the IP address, the MAC address, and port number information that are of the source vRNIC, and does not need to include the IP address and port number information that are of the destination vRNIC. The destination RNIC and the destination vRNIC do not need to obtain the foregoing information when processing the target packet. Therefore, the payload of the target packet may not need to carry the redundant information. In this case, more space in the payload of the target packet may be spared for transmitting the to-be-transmitted data, so that an effective throughput in a network can be improved. In addition, in the foregoing solution, an encapsulation process of the to-be-transmitted data may be completed by an RNIC. Therefore, additional hardware for encapsulating the to-be-transmitted data does not need to be configured. In this way, costs of applying the RDMA technology in the Ethernet can be reduced.

It may be understood that a VXLAN tunnel endpoint (VTEP) may be a physical device or a virtual device. In the method shown in FIG. 3, an RNIC is used as the VTEP. In other words, the source RNIC in the method shown in FIG. 3 may also be referred to as a source VTEP, and the destination RNIC may also be referred to as a destination VTEP. Correspondingly, the IP address of the source RNIC may also be referred to as an IP address of the source VTEP, and the MAC address of the source RNIC may also be referred to as a MAC address of the source VTEP. The IP address of the destination RNIC may also be referred to as an IP address of the destination VTEP, and the MAC address of the destination RNIC may also be referred to as a MAC address of the destination VTEP. As described above, the RNIC is a physical network interface card. Therefore, in the embodiment shown in FIG. 3, the physical network interface card is used as the VTEP for description. In some other embodiments, the VTEP may also be implemented through the virtual device. In other words, the RNIC in the method shown in FIG. 3 may also be understood as a vRNIC. A specific implementation procedure in which the virtual device implements the communication method provided in this application is the same as a specific implementation procedure in which the physical device implements the communication method provided in this application. For brevity, details are not described herein.

To help a person skilled in the art better understand the technical solutions of this application, the following further describes the technical solutions of this application with reference to FIG. 2 and FIG. 3.

It is assumed that two communication parties are the VM 211 and the VM 231. The to-be-transmitted data is stored in a storage apparatus of the VM 211, and the to-be-transmitted data needs to be sent to a storage apparatus of the VM 231. It is assumed that the to-be-transmitted data is "Hello". In this case, the source vRNIC is a vRNIC corresponding to the VM 211, namely, the vRNIC 221. The destination vRNIC is a vRNIC corresponding to the VM 231, namely, the vRNIC 241. The source VTEP is the RNIC 220, and the destination VTEP is the RNIC 240.

It is assumed that an IP address of the vRNIC 221 is 192.168.0.1, an IP address of the vRNIC 241 is 192.168.0.2, and MAC addresses of the vRNICs are 1:2:3:4:5:6. It is assumed that an IP address of the RNIC 220 is 10.0.0.1, a MAC address of the RNIC 220 is A:B:C:D:E:F, an IP address of the RNIC 240 is 10.0.0.2, a MAC address of the RNIC 240 is X:Y:Z:M:N:O, and a VNI is xxx.

In the RC/UC mode, the source VTEP may obtain the target QPC from a QPC cache. The target QPC stores the IP address and the MAC address that are of the destination VTEP, and the MAC address and the VNI that are of the destination vRNIC (or the target QPC points to the foregoing information pointer).

In the RC/UC or UD/RD mode, the source VTEP may obtain the target tunnel entry from the tunnel table. The target tunnel entry stores the VNI, the IP address and the MAC address that are of the destination VTEP, and the MAC address and the VNI that are of the destination vRNIC (or the target QPC points to the foregoing information pointer).

Figure 6:
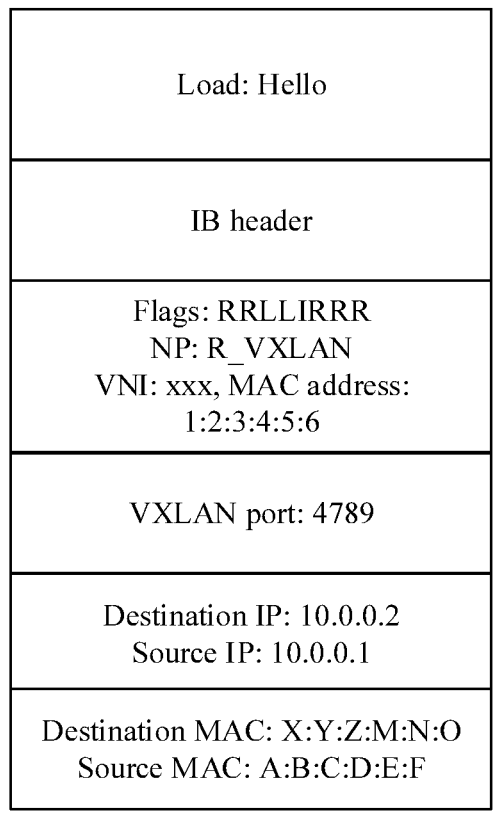
FIG. 6 is a schematic diagram of an encapsulated target packet.

The source VTEP may encapsulate the to-be-transmitted data based on the obtained IP address and MAC address of the destination VTEP, the obtained MAC address and VNI of the destination vRNIC, and the obtained IP address and MAC address of the source VTEP. FIG. 6 shows an encapsulated target packet. The target packet shown in FIG. 6 is encapsulated based on the foregoing content. It may be understood that FIG. 6 shows only some key information in the target packet.

After receiving the target packet, the destination VTEP may determine, based on the port number in the UDP header, that the current packet is a virtual packet encapsulated through a VXLAN. Based on a definition of the VXLAN header, the destination VTEP discovers that the significant second and third bits in the flags field are enabled. Therefore, it may be determined that the packet is an R_VXLAN protocol defined in this embodiment of this application. Further, it may be determined that content carried in the second reserved field is the MAC address of the vRNIC. The destination VTEP may determine, based on the MAC address of the vRNIC and the VNI that are obtained from the VXLAN header, that the destination vRNIC is the vRNIC 241. The destination VTEP sends the target packet to the vRNIC 241. The vRNIC 241 removes an outer packet header, and sends an IB header to an RDMA engine of the VM 231 for processing.

Figure 7:
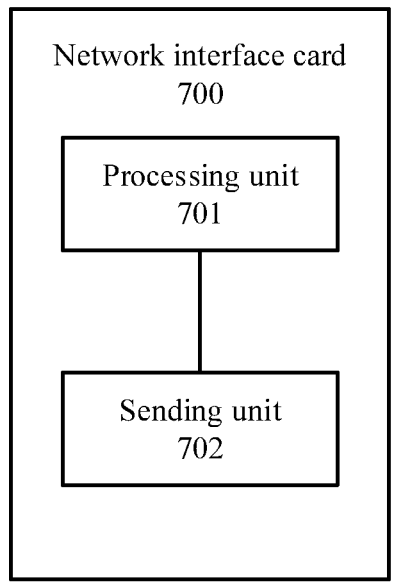
FIG. 7 is a schematic structural block diagram of a network interface card according to an embodiment of this application.

FIG. 7 is a schematic structural block diagram of a network interface card according to an embodiment of this application. The network interface card 700 shown in FIG. 7 includes a processing unit 701 and a sending unit 702. The network interface card 700 is a network interface card that supports an RDMA technology.

The obtaining unit 701 is configured to obtain to-be-transmitted data sent by a source vRNIC. The source vRNIC is a vRNIC running on the network interface card 700.

The processing unit 701 is further configured to obtain identity indication information of a destination vRNIC and packet forwarding information. The packet forwarding information includes an IP address of the network interface card 700, a MAC address of the network interface card 700, an IP address of a destination RNIC, a MAC address of the destination RNIC, and layer 4 port numbers.

The processing unit 701 is further configured to encapsulate the to-be-transmitted data to obtain a target packet. The target packet includes the packet forwarding information, the identity indication information of the destination vRNIC, and the to-be-transmitted data. The target packet does not include at least one piece of the following information an IP address of the source vRNIC, an IP address of the destination vRNIC, a MAC address of the source vRNIC, a port number of the source vRNIC, and a port number of the destination vRNIC.

The sending unit 702 is configured to send the target packet to the destination RNIC. The destination vRNIC is a vRNIC running on the destination RNIC.

The network interface card 700 may be the source RNIC in the foregoing embodiment. The processing unit 701 may be implemented by a processor, and the sending unit 702 may be implemented by a transmitter. For specific functions and beneficial effects of the processing unit 701 and the sending unit 702, refer to the descriptions in the foregoing embodiment.

Figure 8:
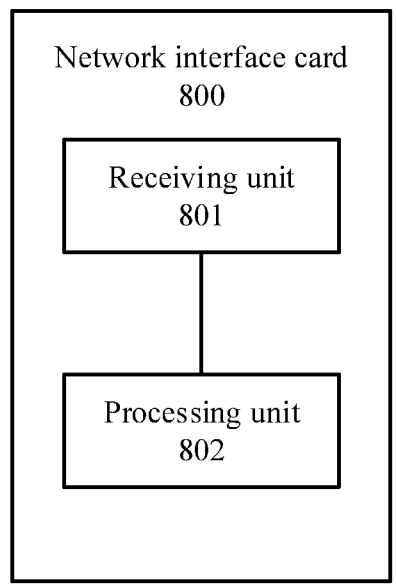
FIG. 8 is a schematic structural block diagram of a network interface card according to an embodiment of this application.

FIG. 8 is a schematic structural block diagram of a network interface card according to an embodiment of this application. The network interface card 800 shown in FIG. 8 includes a receiving unit 801 and a processing unit 802. The network interface card 800 is a network interface card that supports an RDMA technology.

The receiving unit 801 is configured to receive a packet sent by a source RNIC. The packet includes packet forwarding information, identity indication information of a destination vRNIC, and data. The packet forwarding information includes an IP address of the source RNIC, a MAC address of the source RNIC, a port number of the source RNIC, an IP address of the network interface card, a MAC address of the network interface card, and layer 4 port numbers. The target packet does not include at least one piece of the following information an IP address of a source vRNIC, an IP address of the destination vRNIC, a MAC address of the source vRNIC, a port number of the source vRNIC, and a port number of the destination vRNIC. The source vRNIC is a vRNIC running in the source RNIC, and the destination vRNIC is a vRNIC running in the network interface card.

The processing unit 802 is configured to determine the destination vRNIC based on the identity indication information of the destination vRNIC.

The processing unit 802 is configured to send the packet to the destination vRNIC.

The network interface card 800 may be the destination RNIC in the foregoing embodiment. The receiving unit 801 may be implemented by a receiver, and the processing unit 802 may be implemented by a processor. For specific functions and beneficial effects of the receiving unit 801 and the processing unit 802, refer to the descriptions in the foregoing embodiment.

Figure 9:
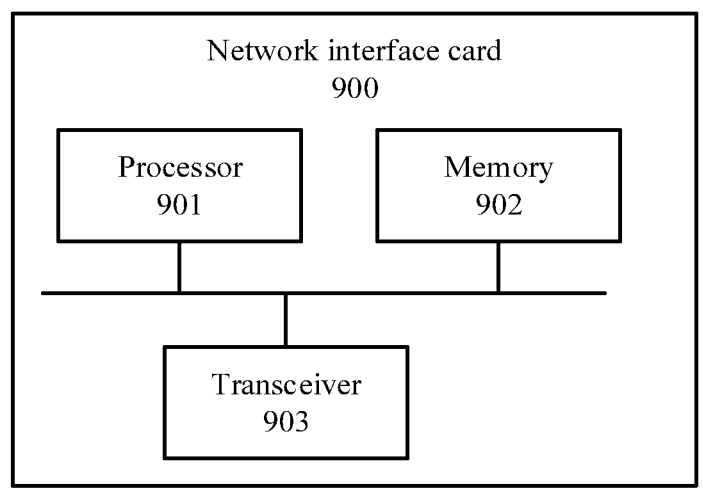
FIG. 9 is a structural block diagram of a network interface card according to an embodiment of this application.

FIG. 9 is a structural block diagram of a network interface card according to an embodiment of this application. The network interface card 900 shown in FIG. 9 includes a processor 901, a memory 902, and a transceiver 903. The network interface card 900 is a network interface card that supports an RDMA technology.

The processor 901, the memory 902, and the transceiver 903 communicate with each other through an internal connection path, to transfer a control and/or data signal.

The methods disclosed in the foregoing embodiments of this application may be applied to the processor 901, or may be implemented by the processor 901. The processor 901 may be an integrated circuit chip and has a signal processing capability. In an implementation process, steps in the foregoing methods can be implemented by a hardware integrated logical circuit in the processor 901, or by instructions in a form of software. The processor 901 may be a general purpose processor, a digital signal processor (DSP), an application-specific integrated circuit (ASIC), a field programmable gate array (FPGA) or another programmable logical device, a discrete gate or transistor logic device, or a discrete hardware component. The processor 901 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory 902, and the processor 901 reads an instruction in the memory 902 and completes the steps in the foregoing methods in combination with hardware of the processor 901. The memory 902 may be independent of the processor 901. In this case, the memory 902 may be connected to the processor 901 through a connection path. In still another possible design, the memory 902 may alternatively be integrated with the processor 901. This is not limited in this embodiment of this application.

Optionally, in some embodiments, the memory 902 may store an instruction used to perform the method performed by the source RNIC in the method shown in FIG. 3. The processor 901 may complete, by executing the instruction stored in the memory 902 in combination with other hardware (for example, the transceiver 903), steps performed by the source RNIC in the method shown in FIG. 3. For a specific working process and beneficial effects, refer to the descriptions in the embodiment shown in FIG. 3.

Optionally, in some embodiments, the memory 902 may store an instruction used to perform the method performed by the destination RNIC in the method shown in FIG. 3. The processor 901 may complete, by executing the instruction stored in the memory 902 in combination with other hardware (for example, the transceiver 903), steps performed by the destination RNIC in the method shown in FIG. 3. For a specific working process and beneficial effects, refer to the descriptions in the embodiment shown in FIG. 3.

An embodiment of this application further provides a chip. The chip includes a transceiver unit and a processing unit. The transceiver unit may be an IO circuit or a communications interface. The processing unit is a processor, a microprocessor, or an integrated circuit integrated on the chip. The chip may perform the method performed by the source RNIC in the foregoing method embodiment.

An embodiment of this application further provides a chip. The chip includes a transceiver unit and a processing unit. The transceiver unit may be an IO circuit or a communications interface. The processing unit is a processor, a microprocessor, or an integrated circuit integrated on the chip. The chip may perform the method performed by the destination RNIC in the foregoing embodiment.

An embodiment of this application further provides a computer-readable storage medium. The computer-readable storage medium stores an instruction. When the instruction is executed, the method performed by the source RNIC in the foregoing method embodiment is performed.

In another form of this embodiment, a computer-readable storage medium is provided. The computer-readable storage medium stores an instruction. When the instruction is executed, the method performed by the destination RNIC in the foregoing method embodiment is performed.

An embodiment of this application further provides a computer program product including an instruction. When the instruction is executed, the method performed by the source RNIC in the foregoing method embodiment is performed.

In another form of this embodiment, a computer program product including an instruction is provided. When the instruction is executed, the method performed by the destination RNIC in the foregoing method embodiment is performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method implemented by a source remote direct memory access (RDMA) network interface card (RNIC), wherein the communication method comprises:
    obtaining to-be-transmitted data from a source virtual RNIC (vRNIC), wherein the source vRNIC runs on the source RNIC;
    obtaining identity indication information of a destination vRNIC and packet forwarding information based on a first identifier of the source vRNIC and a transmission mode used to transmit the to-be-transmitted data, wherein the packet forwarding information comprises a first Internet Protocol (IP) address of the source RNIC, a first media access control (MAC) address of the source RNIC, a second IP address of a destination RNIC, a second MAC address of the destination RNIC, and layer 4 port numbers;
    encapsulating the to-be-transmitted data to obtain a target packet, wherein the target packet comprises the packet forwarding information, the identity indication information, and the to-be-transmitted data, and wherein the target packet does not comprise at least one of a third IP address of the source vRNIC, a fourth IP address of the destination vRNIC, a third MAC address of the source vRNIC, a first port number of the source vRNIC, or a second port number of the destination vRNIC; and
    sending the target packet to the destination RNIC,
    wherein the destination virtual RNIC is a virtual RNIC running on the destination RNIC.

2. The communication method of claim 1, wherein the target packet does not comprise the fourth IP address.

3. The communication method of claim 1, further comprising determining the identity indication information and the packet forwarding information based on a target queue pair context (QPC) in response to the transmission mode being a reliable connection (RC) or an unreliable connection (UC), wherein the target QPC corresponds to connection information and the first identifier.

4. The communication method of claim 1, further comprising:
    determining a target virtual network address from a reference queue pair context (QPC) or a reference work queue element (WQE) in response to the transmission mode being a reliable connection (RC) or an unreliable connection (UC), wherein the target virtual network address comprises at least one of the third IP address or the fourth IP address, wherein the reference QPC corresponds to connection information and the first identifier, and wherein the reference WQE corresponds to the connection information and the first identifier; and
    determining the identity indication information and the packet forwarding information from a tunnel table, wherein the tunnel table comprises at least one tunnel entry, wherein each of the at least one tunnel entry indicates a second identifier of a first vRNIC, a Virtual eXtensible Local Area Network (VXLAN) network identifier (VNI) to which a second vRNIC belongs, a virtual network address, first address information of a first RNIC, and second address information of a second RNIC, wherein the first vRNIC runs in the first RNIC, wherein the second vRNIC runs in the second RNIC, wherein the virtual network address comprises at least one of a fifth IP address of the first vRNIC or a sixth IP address of the second vRNIC, and wherein one of the at least one tunnel entry, that matches the first identifier and the target virtual network address, comprises the packet forwarding information.

5. The communication method of claim 1, further comprising:
in response to the transmission mode being an unreliable data packet (UD) or a reliable data packet (RD), determining a target virtual network address based on a target work queue element (WQE) corresponding to the to-be-transmitted data and the first identifier or determining the target virtual network address based on the target WQE, wherein the target virtual network address comprises at least one of the third IP address or the fourth IP address; and
determining the identity indication information and the packet forwarding information from a tunnel table, wherein the tunnel table comprises at least one tunnel entry, wherein each of the at least one tunnel entry indicates a second identifier of a first vRNIC, a Virtual eXtensible Local Area Network (VXLAN) network identifier (VNI) to which a second vRNIC belongs, a virtual network address, first address information of a first RNIC, and second address information of a second RNIC, wherein the first vRNIC runs in the first RNIC, wherein the second vRNIC runs in the second RNIC, wherein the virtual network address comprises at least one of a fifth IP address of the first vRNIC or a sixth IP address of the second vRNIC, and wherein one of the at least one tunnel entry, that matches the first identifier and the target virtual network address, comprises the packet forwarding information.

6. The communication method of claim 1, further comprising:
sending a request message to at least one target network interface card, wherein each of the at least one target network interface card is configured to run at least one vRNIC, wherein the at least one vRNIC and the source vRNIC belong to a same Virtual eXtensible Local Area Network (VXLAN) network identifier (VNI), wherein the request message comprises a first identifier of the source vRNIC and a target virtual network address, and wherein the target virtual network address comprises at least one of the third IP address or the fourth IP address;
receiving feedback information from the destination RNIC, wherein the feedback information comprises the second IP address and the second MAC address; and
determining the identity indication information and the packet forwarding information based on the feedback information.

7. The communication method of claim 1, wherein the target packet comprises a MAC header, an IP header, a layer 4 port number header, a network virtualization protocol header, and a payload field, wherein the MAC header comprises the first MAC address and the second MAC address, wherein the IP header comprises the first IP address and the second IP address, wherein the layer 4 port number header comprises the layer 4 port numbers, wherein the network virtualization protocol header comprises the identity indication information, and wherein the payload field comprises the to-be-transmitted data.

8. The communication method of claim 1, wherein the identity indication information comprises a Virtual eXtensible Local Area Network (VXLAN) network identifier (VNI) to which the destination vRNIC belongs and a virtual MAC address of the destination vRNIC.

9. A communication method implemented by a destination remote direct memory access (RDMA) network interface card (RNIC), wherein the method comprises:
receiving a target packet from a source RNIC, wherein the packet comprises packet forwarding information, identity indication information of a destination virtual RNIC (vRNIC), and data, wherein the identity indication information and the packet forwarding information are based on a first identifier of the source vRNIC and a transmission mode used to transmit the data, wherein the packet forwarding information comprises a first Internet Protocol (IP) address of the source RNIC, a first media access control (MAC) address of the source RNIC, a second IP address of the destination RNIC, a second MAC address of the destination RNIC, and layer 4 port numbers, wherein the target packet does not comprise at least one of a third IP address of a source vRNIC, a fourth IP address of the destination vRNIC, a third MAC address of the source vRNIC, a first port number of the source vRNIC, or a second port number of the destination vRNIC, wherein the source vRNIC runs in the source RNIC, and wherein the destination vRNIC runs in the destination RNIC;
determining the destination vRNIC based on the identity indication information; and
sending the target packet to the destination vRNIC.

10. The communication method of claim 9, wherein the target packet comprises a MAC header, an IP header, a layer 4 port number header, a network virtualization protocol header, and a payload field, wherein the MAC header comprises the first MAC address and the second MAC address, wherein the IP header comprises the first IP address and the second IP address, wherein the layer 4 port number header comprises the layer 4 port numbers, wherein the network virtualization header comprises the identity indication information, and wherein the payload field comprises the data.

11. A communications apparatus, comprising:
a processor; and
a memory coupled to the processor and configured to store instructions that, when executed by the processor, cause the communications apparatus to be configured to:
obtain to-be-transmitted data from a source virtual remote direct memory access (RDMA) network interface card (vRNIC), wherein the source vRNIC runs on the communications apparatus;
obtain identity indication information of a destination vRNIC and packet forwarding information based on a first identifier of the source vRNIC and a transmission mode used to transmit the to-be-transmitted data, wherein the packet forwarding information comprises a first Internet Protocol (IP) address of the communications apparatus, a first media access control (MAC) address of the communications apparatus, a second IP address of a destination RDMA network interface card (RNIC), a second MAC address of the destination RNIC, and layer 4 port numbers;
encapsulate the to-be-transmitted data to obtain a target packet, wherein the target packet comprises the packet forwarding information, the identity indication information, and the to-be-transmitted data, and wherein the target packet does not comprise at least one of a third IP address of the source vRNIC, a fourth IP address of the destination vRNIC, a third MAC address of the source vRNIC, a first port number of the source vRNIC, or a second port number of the destination vRNIC; and send the target packet to the destination RNIC, wherein the destination vRNIC runs on the destination RNIC.

12. The communications apparatus of claim 11, wherein the target packet does not comprise the second port number.

13. The communications apparatus of claim 11, wherein the instructions further cause the communications apparatus to be configured to determine the identity indication information of the destination vRNIC and the packet forwarding information based on a target queue pair context (QPC) when the transmission mode is a reliable connection (RC) or an unreliable connection (UC), and wherein the target QPC corresponds to connection information and the first identifier.

14. The communications apparatus of claim 11, wherein the instructions further cause the communications apparatus to be configured to:

determine a target virtual network address from a reference queue pair context (QPC) or a reference work queue element (WQE) when the transmission mode is a reliable connection (RC) or an unreliable connection (UC), wherein the target virtual network address comprises at least one of the third IP address or the fourth IP address, wherein the reference QPC corresponds to connection information and the first identifier, and wherein the reference WQE corresponds to the connection information and the first identifier; and determine the identity indication information and the packet forwarding information from a tunnel table, wherein the tunnel table comprises at least one tunnel entry, wherein each of the at least one tunnel entry indicates a second identifier of a first vRNIC, a Virtual eXtensible Local Area Network (VXLAN) network identifier (VNI) to which a second vRNIC belongs, a virtual network address, first address information of a first RNIC, and second address information of a second RNIC, wherein the first vRNIC runs in the first RNIC, wherein the second vRNIC runs in the second RNIC, wherein the virtual network address comprises at least one of a fifth IP address of the first vRNIC or a sixth IP address of the second vRNIC, and wherein one of the at least one tunnel entry, that matches the first identifier and the target virtual network address, comprises the packet forwarding information.

15. The communications apparatus of claim 11, wherein the instructions further cause the communications apparatus to be configured to:

when the transmission mode is an unreliable data packet (UD) or a reliable data packet (RD), determine a target virtual network address based on a target work queue element (WQE) corresponding to the to-be-transmitted data and the first identifier or determine the target virtual network address based on the target WQE, wherein the target virtual network address comprises at least one of the third IP address or the fourth IP address; and determine the identity indication information and the packet forwarding information from a tunnel table, wherein the tunnel table comprises at least one tunnel entry, wherein each of the at least one tunnel entry indicates a second identifier of a first vRNIC, a Virtual eXtensible Local Area Network (VXLAN) network identifier (VNI) to which a second vRNIC belongs, a virtual network address, first address information of a first RNIC, and second address information of a second RNIC, wherein the first vRNIC runs in the first RNIC, wherein the second vRNIC runs in the second RNIC, wherein the virtual network address comprises at least one of a fifth IP address of the first vRNIC or a sixth IP address of the second vRNIC, and wherein one of the at least one tunnel entry, that matches the first identifier and the target virtual network address, comprises the packet forwarding information.

16. The communications apparatus of claim 11, wherein the instructions further cause the communications apparatus to be configured to:

send a request message to at least one target network interface card, wherein each of the at least one target network interface card is configured to run at least one vRNIC, wherein the at least one vRNIC and the source vRNIC belong to a same Virtual eXtensible Local Area Network (VXLAN) network identifier (VNI), wherein the request message comprises a first identifier of the source vRNIC and a target virtual network address, and wherein the target virtual network address comprises at least one of the third IP address or the fourth IP address;

receive feedback information from the destination RNIC, wherein the feedback information comprises the second IP address and the second MAC address; and determine the identity indication information and the packet forwarding information based on the feedback information.

17. The communications apparatus of claim 11, wherein the target packet comprises a MAC header, an IP header, a layer 4 port number header, a network virtualization protocol header, and a payload field, wherein the MAC header comprises the first MAC address and the second MAC address, wherein the IP header comprises the first IP address and the second IP address, wherein the layer 4 port number header comprises the layer 4 port numbers, wherein the network virtualization protocol header comprises the identity indication information, and wherein the payload field comprises the to-be-transmitted data.

18. The communications apparatus of claim 11, wherein the identity indication information comprises a Virtual eXtensible Local Area Network (VXLAN) network identifier (VNI) to which the destination vRNIC belongs and a virtual MAC address of the destination vRNIC.

19. A communications apparatus comprising:
a processor; and
a memory coupled to the processor and configured to store instructions that, when executed by the processor, cause the communications apparatus to be configured to:

receive a target packet from a source remote direct memory access (RDMA) network interface card (RNIC), wherein the packet comprises packet forwarding information, identity indication information of a destination virtual RNIC (vRNIC), and data, wherein the identity indication information and the packet forwarding information are based on a first identifier of the source vRNIC and a transmission mode used to transmit the data, wherein the packet forwarding information comprises a first Internet Protocol (IP) address of the source RNIC, a first Media Access Control (MAC) address of the source RNIC, a second IP address of the communications apparatus, a second MAC address of the communications apparatus, and layer 4 port numbers, wherein the target packet does not comprise at least one of a third IP address of a source vRNIC, a fourth IP address of the destination vRNIC, a third MAC address of the source vRNIC, a first port number of the source vRNIC, or a second port number of the destination vRNIC, wherein the source vRNIC runs in the source RNIC, and wherein the destination vRNIC runs in the communications apparatus;

determine the destination vRNIC based on the identity indication information; and send the target packet to the destination vRNIC.

20. The communications apparatus of claim 19, wherein the target packet comprises a MAC header, an IP header, a layer 4 port number header, a network virtualization protocol header, and a payload field, wherein the MAC header comprises the first MAC address and the second MAC address, wherein the IP header comprises the first IP address and the second IP address, wherein the layer 4 port number header comprises the layer 4 port numbers, wherein the network virtualization header comprises the identity indication information, and wherein the payload field comprises the data.

* * * * *